(12) United States Patent
Reichold et al.

(10) Patent No.: US 12,736,324 B2
(45) Date of Patent: Sep. 15, 2026

(54) INTERFEROMETRIC DISPLACEMENT MEASUREMENT APPARATUS

(71) Applicant: Oxford University Innovation Limited, Oxford (GB)

(72) Inventors: Armin Reichold, Oxford (GB); Peter Qui, Oxford (GB); Songyuan Zhao, Oxford (GB); Edgar Brucke, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 303 days.

(21) Appl. No.: 18/576,115

(22) PCT Filed: Jul. 8, 2022

(86) PCT No.: PCT/GB2022/051759
§ 371 (c)(1),
(2) Date: Jan. 3, 2024

(87) PCT Pub. No.: WO2023/281270
PCT Pub. Date: Jan. 12, 2023

(65) Prior Publication Data
US 2024/0310158 A1 Sep. 19, 2024

(30) Foreign Application Priority Data
Jul. 9, 2021 (GB) ..................................... 2109964

(51) Int. Cl.
*G01B 9/02003* (2022.01)
*G01B 9/02* (2022.01)
(Continued)

(52) U.S. Cl.
CPC ....... *G01B 9/02003* (2013.01); *G01B 9/0201* (2013.01); *G01B 9/02012* (2013.01);
(Continued)

(58) Field of Classification Search
CPC .............. G01B 9/02003; G01B 9/0201; G01B 9/02057; G01B 9/02081
See application file for complete search history.

(56) References Cited

U.S. PATENT DOCUMENTS 5,412,474 A 5/1995 Reasenberg et al.
9,804,021 B2 10/2017 Farhadiroushan et al.
(Continued)

FOREIGN PATENT DOCUMENTS

WO WO-2023002050 A1 * 1/2023 ......... G01B 9/02019

OTHER PUBLICATIONS

Wu, Guanhao et al. "Synthetic wavelength interferometry of an optical frequency comb for absolute distance measurement". Scientific Reports, 8:4362, Mar. 12, 2018. (Year: 2018).*
(Continued)

*Primary Examiner* — Michael A Lyons
(74) *Attorney, Agent, or Firm* — Thomasl Horstemeyer, LLP

(57) ABSTRACT

An interferometric displacement measurement apparatus (100) includes at least one measurement interferometer (103) for measuring a change in optical path difference between a measurement beam (150) and a reference beam. A light source module (118) is arranged to generate a modulated light beam, having a particular optical spectrum, from which the measurement beam and reference beam are derived. A data acquisition and analysis module (105) can determine a measure representative of the displacement using interference intensity data received from a photodetector (111) which detects the interference of the measurement beam with the reference beam.

19 Claims, 9 Drawing Sheets

(51) Int. Cl.
*G01B 9/02001* (2022.01)
*G01B 9/02015* (2022.01)
*G01B 9/02055* (2022.01)
*G01B 9/02056* (2022.01)

(52) U.S. Cl.
CPC ..... *G01B 9/02027* (2013.01); *G01B 9/02057* (2013.01); *G01B 9/02081* (2013.01); *G01B 9/02083* (2013.01); *G01B 2290/45* (2013.01)

(56) References Cited

U.S. PATENT DOCUMENTS

| | | | | |
|---|---|---|---|---|
| 2013/0148129 | A1* | 6/2013 | Warden | G01B 11/14 356/498 |
| 2016/0356823 | A1* | 12/2016 | Gu | G01D 5/266 |

OTHER PUBLICATIONS

International Search Report and Written Opinion for WO 2023/281270 (PCT/GB2022/051759), dated Oct. 7, 2022, pp. 1-22.
UK Search Report for GB 2109964.3, dated Apr. 28, 2022, pp. 1-5.
Zhao Xianyu et al: "Absolute distance measurement by multi-heterodyne interferometry using an electro-optic triple comb", Optics Letters vol. 43, No. 4 Feb. 9, 2018 (Feb. 9, 2018), pp. 807-810.
Mueller Chris Let al: "The advanced LIGO input optics", Review of Scientific Instruments, American Institute of Physics, 2 Huntington Quadrangle, Melville, NY 11747, vol. 87, No. 1, Jan. 22, 2016 (Jan. 22, 2016).

* cited by examiner

INTERFEROMETRIC DISPLACEMENT MEASUREMENT APPARATUS

CROSS-REFERENCE TO RELATED APPLICATIONS

This application is the National Stage of International Application No. PCT/GB2022/051759, filed Jul. 8, 2022, which claims priority to GB 2109964.3, filed Jul. 9, 2021, which are entirely incorporated herein by reference.

FIELD OF THE PRESENT DISCLOSURE

This invention relates to an interferometric displacement measurement apparatus for taking displacement measurements, in particular by using a phase modulated light source.

BACKGROUND OF THE PRESENT DISCLOSURE

Interferometers can measure dimensions and displacements with a high level of precision. In general, interferometers operate by transmitting two or more beams along two or more respective beam paths. The two or more beams are then superposed at a detector where they exhibit interference. The desired measurement information can then be extracted from the interference intensity measured at a detector.

There are many different interferometric measurement techniques available. In particular, displacement measurement interferometry involves reflecting a reference beam at a reference surface and reflecting a measurement beam at a measurement surface, the reference surface and measurement surface being spaced apart along an axis. Changes in the optical path difference (OPD) between the reference beam and the measurement beam due to displacement of the measurement surface can be determined from the interference intensity arising from their superposition.

One such technique, for measuring displacements, uses phase modulation of a light source. This allows displacement measurements to be taken by modulating a measurement beam and/or a reference beam.

The Applicant has recognised that those existing phase modulation techniques which modulate light at the source (the same modulated light that comprises the reference beam and the measurement beam) are only effective for a small fixed range of measurement distances and their operating parameters (e.g. the modulation frequency for modulating the light source) have to be tuned to that range. This in turn means that the same modulated light source cannot be used to operate multiple interferometers that measure multiple displacements over distances which simultaneously span a distance range in excess of the above mentioned fixed range.

Other existing phase modulation techniques may modulate only one of the two beams. These require a modulation device for each interferometer near the beam splitter where the reference and measurement beams are separated. This makes them more complex, larger, heavier and their cost increases more rapidly as the number of distances they measure simultaneously increases.

SUMMARY OF THE PRESENT DISCLOSURE

The present invention aims to provide an improved interferometric displacement measurement apparatus which overcomes at least the above limitations.

From a first aspect, the invention provides an interferometric displacement measurement apparatus, comprising:

at least one measurement interferometer for measuring a change in optical path difference between a measurement beam and a reference beam, the reference beam and the measurement beam having an optical path difference determined by a longitudinal dimension of the measurement interferometer, said change in optical path difference being caused by a respective displacement, wherein the at least one measurement interferometer comprises a photodetector for detecting the interference of the measurement beam with the reference beam;

a data acquisition and analysis module arranged to receive interference intensity data from the photodetector; and a light source module comprising:

a light source arranged to output light having a substantially constant optical carrier frequency; and an electro-optic modulator arranged to modulate the light output from the light source;

wherein the light source module is arranged to generate a modulated light beam, from which the measurement beam and reference beam are derived; and wherein an optical spectrum of the modulated light beam comprises:

a first set of equally spaced frequency peaks having a first frequency spacing, wherein the number, position and power of frequency peaks in the first set are a function of a first modulation frequency and a first modulation depth, and wherein the first set is centred on a central frequency; and a second set of equally spaced frequency peaks having a second frequency spacing, wherein the number, position and power of frequency peaks in the second set are a function of a second modulation frequency and a second modulation depth, and wherein the second set is centred on the same central frequency as the first set;

wherein the first frequency spacing is different to the second frequency spacing and the frequency peaks of the first and second sets are phase locked against each other;

wherein the electro-optic modulator is arranged to be driven by a phase modulation voltage that causes the electro-optic modulator to generate the optical spectrum from the light source, wherein the phase modulation voltage is a time dependent function of the first modulation frequency, the second modulation frequency, the first modulation depth and the second modulation depth, the first modulation frequency determining the first frequency spacing and the second modulation frequency determining the second frequency spacing; and wherein the data acquisition and analysis module is arranged to determine a measure representative of the displacement using the interference intensity data received from the photodetector.

Thus it will be seen that, in accordance with the invention, the interferometric displacement measurement apparatus is operable to measure changes over time in the optical path difference travelled by the measurement beam. In particular, by modulating a light beam with a (time-varying, e.g. DC) phase modulation voltage, an optical spectrum may be obtained which provides a range of frequencies (the first and second set) without having to change the optical carrier frequency of the light source or the modulation frequencies and modulation depths (collectively referred to herein as the modulation scheme). A single modulated light source drives the at least one (e.g. a plurality of) interferometer(s) which can simultaneously measure changes of (respective) optical path difference(s) over a wide range of distances. This helps to make the claimed apparatus cost effective, compact and simple as the apparatus does not require a modulator per interferometer. The invention may, therefore, measure multiple lines for a large range of arbitrary distances.

This is in contrast to existing techniques which require tuning of the modulation scheme to suit the distance to be measured, making such techniques unsuitable for the simultaneous measurement of a wide range of displacements. The optical spectrum of the modulated beam used in the present invention has characteristics that allow a displacement (i.e. a change in the optical path difference) to be determined for a range of distances using a light source of constant optical carrier frequency which is modulated by a (time-varying) modulation voltage that does not need to be changed to accommodate different optical path differences.

The interferometric displacement measurement apparatus is arranged to interfere two waves, the reference beam and the measurement beam, with multiple frequency components (peaks) that are (e.g. all) phase locked relative to each other. As such, the interference intensity data will be expected to show multiple sinusoidal oscillations with frequencies corresponding to the differences between any pair of these frequency components. From this interference intensity data, the data acquisition and analysis module determines a measure representative of the displacement (i.e. which may have caused a change in the optical path difference).

The invention helps to provide a number of benefits compared to existing displacement measurement interferometers.

Embodiments in accordance with the invention may use a single light source (i.e. a laser and an electro-optic modulator) to serve one or more (e.g. a large number of interferometers). Because the apparatus may use a single source module (i.e. a laser and electro-optic modulator) for a plurality of interferometers, the technique scales very efficiently with the number of interferometers. The number of measurement interferometers may only be limited by the light source power (e.g. the laser power) which may be easily scaled up using (e.g. laser) amplifiers.

Embodiments of the invention are "multiline capable" as each of the at least one interferometer(s) are independent of each other and can each measure displacements for respectively different distances at any time. Furthermore, only a single photodetector for each measurement interferometer may be necessary (e.g. to construct a quadrature signal from the interference intensity data received at the photodetector). Furthermore, simple optics may be used for the measurement interferometer (e.g. an optical fibre and a reflector).

Some existing phase modulation techniques use a modulation frequency that has to be adjusted to suit the distance range. This makes them unsuitable for the measurement of multiple distances over a wide range of different distances. Other phase modulation techniques (e.g. phase stepping interferometers) only phase modulate the measurement wave and not the reference wave. These require one phase modulator per measured displacement (i.e. per measurement interferometer). The main disadvantage of techniques that only modulate the measurement beam is that they require a full modulator and associated driver for each measurement 'arm', which is expensive and adds complexity, weight and extra requirements for electric signals at the launch (i.e. proximal to the light source) of each interferometer.

Phase modulation techniques according to the state of the art can thus only work for a fixed range of measurement distances and their operating parameters have to be tuned to that range. Embodiments in accordance with the invention are able to use a single modulation scheme (using a modulation frequency pair and modulation depth pair) to simultaneously measure displacements over an arbitrary number of a wide range of different distances (e.g. from 0.1 m up to 45 m, e.g. from 0.4 m up to m), without having to change the operating parameters (e.g. the modulation frequencies).

Embodiments of the invention may be useful in computer numerical control (CNC) machines for precise manufacturing—e.g. replacing the glass rulers (scales) of CNC machines. Apparatus embodying the invention may be useful for aligning and stabilising critical components in scientific equipment (e.g. telescope mirrors, accelerator components or High Energy Physics (HEP) detectors). Embodiments using a single measurement interferometer may be used in laser trackers or laser tracers or as part of geodetic instruments (e.g. total stations or mekometers) or as laboratory metrology equipment for calibration purposes.

In a set of embodiments, the interferometric displacement measurement apparatus uses optical fibres for beam delivery. Therefore, the apparatus may be largely fibre-based. In a set of such embodiments, the light source is connected to the measurement interferometer via one or more optical fibre(s). In some embodiments, the only part of the apparatus where optical fibres are not used to transmit light is when the measurement beam is transmitted across free-space in the measurement interferometer. Having an optical fibre-based apparatus helps to reduce the distorting effect of variable refractive index in the air (e.g. due to temperature changes) and reduces the environmental requirements of the apparatus (e.g. vibration, air pressure, humidity and temperature). This also helps to reduce the size and weight of the apparatus. All of the above helps to allow the apparatus to be used in a wider variety of environments.

The measure, determined by the data acquisition and analysis module, may be any suitable and desired measure representative of the displacement. In a set of embodiments, the measure is the change in optical path difference between the reference beam and the measurement beam. In a set of embodiments, the measure is the displacement of a reflector or a measurement surface, e.g. at a distal end of the measurement interferometer.

In order to obtain the displacement from the change in optical path difference, the refractive index (e.g. of the medium through which the measurement beam travels, e.g. air) preferably should be known. This is typically computed from measurements of atmospheric parameters (e.g. temperature, pressure, humidity and sometimes also $CO_2$ concentration).

The at least one measurement interferometer may be any suitable type, however, in a set of preferred embodiments, the measurement interferometer is a Fizeau interferometer. The photodetector may comprise a (e.g. high-bandwidth) photodiode.

The measurement interferometer may have a distal end and a proximal end. The measurement interferometer may comprise a reflector (e.g. a retroreflector)—e.g. defining the distal end. The reflector may comprise a measurement surface. The measurement interferometer may comprise a collimator—e.g. proximal to the proximal end. Having a collimator helps the apparatus to measure displacements over longer distances. The measurement interferometer may comprise a beam splitter comprising a beam splitting surface for splitting the modulated beam into the measurement beam and the reference beam.

In a set of embodiments, the beam splitter is arranged to reflect a first part of the modulated light beam (e.g. to the photodetector). The reference beam may comprise the first part of the modulated light beam. A second part of the modulated light beam (e.g. the remaining light) may be transmitted through the beam splitter (e.g. from the proximal end toward the distal end). The measurement beam may comprise the second part of the modulated light beam. Therefore, the measurement beam may be transmitted at the beam splitter (whereas the reference beam may be reflected) and so travels a further distance (e.g. toward the reflector and back through the beam splitter) compared to the reference beam.

In this way, the measurement beam may travel an extra optical path length compared to the reference beam. This extra optical path length (the optical path difference) may be proportional to the longitudinal dimension (e.g. the length) of the measurement interferometer. The optical path difference between the measurement and reference beam may be proportional to the distance between a beam splitting surface of the beam splitter and the reflector in the measurement interferometer (e.g. the longitudinal dimension, e.g. the length of the measurement interferometer). The interferometric displacement measurement apparatus may measure changes in the extra optical path length travelled by the measurement beam over time (i.e. changes in the optical path difference over time). Therefore, the change in the longitudinal dimension of the measurement interferometer may be measured accurately by the interferometric displacement measurement apparatus.

In a set of embodiments, the at least one measurement interferometer comprises a respective optical fibre, a respective beam splitter, and a respective reflector (e.g. a retroreflector). In some embodiments, each optical fibre is followed by a respective collimator. In some embodiments, the beam splitter is provided by the end of the optical fibre. In other embodiments, the beam splitter is provided by the collimator (e.g. at one surface of a collimating lens). The optical fibre may be referred to as a launch fibre which is arranged to transmit light into free space and receive light from free space.

In a set of embodiments, the interferometric displacement measurement apparatus comprises a plurality of measurement interferometers. Preferably each of the plurality of measurement interferometers are arranged to receive a respective measurement beam and a respective reference beam. The plurality of measurement interferometers may have respectively different longitudinal dimensions (e.g. lengths). The plurality of measurement interferometers may be oriented in any particular direction with respect to each other. The light source module and data acquisition and analysis module may be common to a plurality of measurement interferometers. Having a plurality of measurement interferometers allows a plurality of different measurements to be made simultaneously. This may be useful if it is necessary to accurately measure several different dimensions of a system—e.g. which may be oriented in any particular way with respect to each other.

The displacement (e.g. of a reflector in the measurement interferometer) is typically proportional to the change in optical path difference between the measurement beam and the reference beam. In a set of embodiments, the interferometric displacement measurement apparatus is used to measure the change in optical path difference over time. Therefore, when the change in optical path difference is known (from the measurements made by the apparatus), an initial value of optical path difference may be used to infer the optical path difference at any later time. The initial value of the optical path difference may be measured using absolute distance measurement interferometry—e.g. frequency scanning interferometry (FSI).

As mentioned above, the optical carrier frequency of the light source is substantially constant. The light source may be arranged to output light at the central frequency. In a preferred set of embodiments, the central frequency is the optical carrier frequency ($v_c$) which is known in absolute terms with an uncertainty less than the desired distance (or displacement) measurement uncertainty. This helps to limit measurement errors.

Those skilled in the art will appreciate that in physics the term 'light' may refer to electromagnetic radiation of any wavelength. Therefore, the light source may be arranged to output a beam of any suitable wavelength which can be detected by the photodetector—e.g. wavelengths in the range between radar and UV light. In a set of embodiments, the optical carrier frequency is in the near infrared range—e.g. approximately 1550 nm (e.g. within +20%).

In a set of embodiments, the light source comprises a laser source—e.g. a near infrared laser source. This may allow the apparatus to be used with high bandwidth photodetectors and affordable high quality lasers. However, it may be preferable for providing better resolution to use smaller wavelengths rather than larger wavelengths because the resolution is inversely proportional to the wavelength of the light source.

Preferably the electro-optic modulator comprises a material having a voltage-tunable refractive index. In such an electro-optic modulator, the phase of the light that is passed through the material may experience a changing refractive index, which modulates the beam in accordance with the modulation voltage. The intensity and frequency (e.g. carrier frequency) of the light input into the electro-optic modulator preferably remains constant.

The phase modulation voltage helps to ensure the optical spectrum of the modulated light beam is suitable for measuring an improved range of distances. The optical spectrum may be subject to further constraints, which may improve the range of distances that can be measured without having to tune the modulation frequency. For instance, in a preferred set of embodiments, the difference between any two peak frequencies (i.e. from the first and second set of frequency peaks) is no less than half of the largest expected Doppler shift caused by motion within the measurement interferometer. Here "expected" refers to the Doppler shift that may occur when the reflector moves at a maximum tolerable speed $v_{max}$ for which the interferometric displacement measurement apparatus is designed—i.e. in accordance with a known limit of the interferometric displacement measurement apparatus.

In a set of example embodiments, the maximum speed that an apparatus embodying the invention may tolerate is approximately 1 m/s. In a set of embodiments, the maximum Doppler shift for $v_{max}$=1 m/s is approximately 1.3 MHz. It may be possible to operate with a lower maximum motion speed (i.e. less than the maximum tolerable speed) and hence improve the measurement resolution. However, to lower the speed limit and increase the resolution requires a "cost" in terms of computing resources (e.g. in the data acquisition and analysis module—e.g. the FPGA).

In some embodiments, the interferometric displacement measurement apparatus interferes a measurement beam and a reference beam having frequency peaks that are mutually phase locked. The interference intensity data may thus comprise sinusoidal oscillations with frequencies corresponding to the differences between any pair of peak frequencies (i.e. from the first and second set).

Typically, the interference intensity data comprises odd interference intensity frequency bands and even interference intensity frequency bands at frequencies equivalent to a linear combination of the first modulation frequency and the second modulation frequency—e.g. $f_{j,h}=jf_{m_1}+hf_{m_2}$ where j and h can be any integer and $f_{m_1}$ and $f_{m_2}$ are the above mentioned two modulation frequencies. The interference intensity frequency bands may be considered "odd" if j+h is an odd whole number and are "even" if j+h is an even whole number. Therefore, in a set of embodiments, the interference intensity data comprises a plurality of odd interference intensity frequency bands and a plurality of even interference intensity frequency bands.

In a set of embodiments, the odd interference intensity frequency bands and the even interference intensity frequency bands are unique (or separated)—i.e. such that no odd interference intensity frequency band falls onto an even interference intensity frequency band and vice versa. This helps to allow the data acquisition and analysis module to generate a quadrature signal from the interference intensity data. This may be achieved by selecting the first modulation frequency and second modulation frequency so that all odd combinations of j and h give frequencies different from all even combinations of j and h.

Preferably each modulation frequency gives rise to an equivalent frequency spacing (e.g. a modulation frequency of 20 MHz gives a frequency spacing of 20 MHz). Therefore, preferably the first frequency spacing is equal to the first modulation frequency and the second frequency spacing is equal to the second modulation frequency.

In conventional displacement measurement interferometers, the speed of motion (e.g. of a measurement surface or reflector in the measurement interferometer) that the apparatus can tolerate (while reliably measuring the displacement) is limited in two ways.

Firstly, the rate at which existing interferometers sample the intensity data is limited. Therefore, in a set of embodiments, the interference intensity data is sampled (by the photodetector) at least twice per quarter wavelength of displacement.

Secondly, for phase modulation techniques in particular, the maximum tolerable motion speed (e.g. of the reflector in the measurement interferometer) is typically limited by the frequency separation of the peaks of the interference intensity frequency bands in the interference intensity data (e.g. spectrum).

In a set of embodiments, the displacement is caused by motion of a measurement surface (e.g. a reflector). If the peaks of the interference intensity frequency bands are chosen to be further apart than twice the Doppler frequency shift created by the motion, then such embodiments may provide a technique that can track faster objects in real time and with higher resolution.

In a set of embodiments, the data acquisition and analysis module comprises a low pass filter. The low pass filter pass band may be adjusted to suit a required maximum motion speed—e.g. if the required maximum motion speed is less than the maximum tolerable motion speed. The motion speed is to be understood to be the rate of change of displacement. For example, if the required maximum motion speed is less than the maximum tolerable motion speed, the pass band of the low-pass filter may be lowered which improves resolution.

In a set of embodiments, the interferometric displacement measurement apparatus comprises at least one analogue to digital converter (ADC). The maximum motion speed and/or shortest measurable distance may be increased by increasing the ADC sampling frequency and adjusting the modulation frequencies.

In a set of preferred embodiments, the first frequency spacing and the second frequency spacing are each stable (e.g. substantially constant) in time. Preferably, their residual time variations (if any) are available or known in real time—e.g. within the data acquisition and analysis module. Such residual time variations may be caused by sampling clock variations which typically occur because master oscillators in the data acquisition and analysis module (which also drive the modulator) are not completely stable—e.g. due to temperature changes. Preferably, the frequency variation of the modulation frequencies and the frequency variation of the demodulation frequencies are caused by the variations of a common clock frequency. Such embodiments help to make the interferometric displacement measurement apparatus insensitive to any clock variations.

In a set of embodiments, the larger of the two frequency spacings is less than half the Nyquist frequency of the apparatus—e.g. of the data acquisition and analysis module, e.g. of a digitiser of the data acquisition and analysis module. This helps to ensure that at least one of the later mentioned interference intensity frequency bands arising from the larger of the two modulation frequencies is of even nature.

The first frequency spacing and the second frequency spacing may form a near-irrational ratio. The term "near-irrational" is used in this context to describe an irreducible fraction, which is a ratio of two integers both with many digits—e.g. at least three digits each. In a set of embodiments the first frequency spacing ($\Delta v_1$) and second frequency spacing ($\Delta v_2$) are such that $$k\frac{\Delta v_1}{\Delta v_2} \neq n$$

for $k>10^6$ (e.g. for $k>10^9$) where k and n are integers.

As described above, the phase modulation voltage is a time dependent function of the first frequency spacing (or modulation frequency, $f_{m_1}$), the second frequency spacing (or modulation frequency, $f_{m_2}$), the first modulation depth ($\beta_1$) and the second modulation depth ($\beta_2$). It will be appreciated that a greater modulation depth requires a greater amplitude of the phase modulation voltage to be applied. In a set of embodiments, the phase modulation voltage V(t) takes the form $V_{mod}(t)=V_1 \sin(2\pi f_{m1}t)+V_2 \sin(2\pi f_{m2}t)$ where the amplitudes $V_1$ and $V_2$ are proportional to $\beta_1$ and $\beta_2$, respectively.

The selected values of the first modulation depth, the second modulation depth, the first modulation frequency and the second modulation frequency are referred to herein as a modulation scheme. The Applicant has determined a suitable modulation scheme which gives rise to a modulated light beam with the optical spectrum having the characteristics described in accordance with embodiments of the invention.

When the optical path difference (OPD) is zero all interference intensity frequency bands (i.e. from the interference intensity data) are always zero. A similar effect occurs at the maximum measurable distance. At this maximum measurable distance the sum (e.g. the sum of the power) of all the interference intensity frequency bands will be zero unless the ratio of modulation frequencies is truly irrational (which is not realistic). At other distances between zero and the maximum measurable distance, the summed odd interference intensity frequency bands (e.g. the summed power of the odd frequency bands) or the summed even interference intensity frequency bands (e.g. the summed power of the odd interference intensity frequency bands) goes to a minimum leading to locations/distances with locally greatest measurement uncertainty.

Higher modulation frequencies may allow a faster onset of power or intensity in all interference intensity frequency bands as the OPD rises from zero. Therefore, the larger of the first modulation frequency and the second modulation frequency may be chosen to be just below the maximum allowable modulation frequency.

To minimise the distance at which the invention can function with acceptable errors, one of the modulation frequencies may be chosen to be as large as possible whilst still generating at least one harmonic below the Nyquist frequency. In a set of embodiments, according to this criterion, a maximum value for the larger of the two modulation frequencies may be half of the Nyquist frequency of the data acquisition and analysis module (e.g. 30.6 MHz). To allow, for example, the anti-aliasing filter to roll off without affecting the first harmonic of the larger of the modulation frequencies, in a set of embodiments, the larger of the two modulation frequencies is chosen to be below the maximum value—e.g. at least 2 MHz below the maximum value or e.g. at least 5% lower than the maximum value or e.g. lower than said maximum value by at least half of the maximum expected Doppler shift caused by motion within the measurement interferometer. Once the first modulation frequency has been determined, the second modulation frequency may be deduced from the criteria required of the optical spectrum. Therefore, in a set of embodiments, the first modulation frequency is between 27 MHz and 28 MHz, e.g. 27.778 MHz, and the second modulation frequency is between 20 MHz and 21 MHz, e.g. 20.833 MHz.

Once the first and second modulation frequencies are chosen, the first and second modulation depths may be determined, to complete the modulation scheme. In one embodiment, a suitable range for the first modulation depth and the second modulation depth may be found using a grid search, varying the first and second modulation depths and then checking expected measurement performance across the desired range of optical path differences (OPDs) (i.e. a range of distances). The grid search may be analysed with respect to a certain criterion. In a set of embodiments, it is determined which modulation depth pair (i.e. first modulation depth and second modulation depth) gives the highest measure (e.g. of power) of, preferably, the weakest summed band at distances between a minimum distance and a maximum distance. The minimum distance may be the shortest distance at which said measure (e.g. summed power) of the odd interference intensity frequency bands and even interference intensity frequency bands (for any modulation scheme) becomes suitably large to support a high-quality measurement.

In a set of embodiments, the first modulation depth is between 1.5 and 1.8 (i.e. $1.5 \le \beta_1 \le 1.8$) and the second modulation depth is between 1.5 and 1.8 (i.e. $1.5 \le \beta_2 \le 1.8$). For example, the first modulation depth may be 1.7 and the second modulation depth may be 1.6. These values have been determined by the Applicant to provide suitable interferometric quadrature signals—e.g. giving strong enough summed (e.g. powers of the) odd interference intensity frequency bands and summed (e.g. powers of the) even interference intensity frequency bands for every measured displacement in a nominal range of distances, e.g. 0.1 m to 45 m—e.g. 0.5 m to 44 m.

In a set of embodiments, a modulation scheme is determined, wherein the modulation scheme is used to generate the phase modulation voltage for modulating a light beam from which the measurement beam and the reference beam are derived. The modulation scheme may comprise the first modulation frequency, the second modulation frequency, the first modulation depth and the second modulation depth. A modulation frequency pair comprising the first modulation frequency and the second modulation frequency may be determined. Given said modulation frequency pair, a modulation depth pair may be determined, the modulation depth pair comprising the first modulation depth and the second modulation depth. A modulation depth pair may be selected for the modulation scheme from a plurality of modulation depth pairs.

A first measure representative of the (e.g. expected) sum of the power of the odd interference intensity frequency bands and a second measure representative of the (e.g. expected) sum of the power of the even interference intensity frequency bands from the plurality of optical path differences may be determined. In a set of embodiments, for each modulation depth pair the lower of the first measure and the lower of the second measure is determined. From the plurality of modulation depth pairs, a modulation depth pair may be selected which gives the largest value of said lower measure. In a set of preferred embodiments, the first measure is the lowest first measure determined over the range of optical path differences and the second measure is the lowest second measure determined over the range of optical path differences. Preferably, the selected modulation depth pair is the modulation depth pair used in the modulation scheme.

As described above, in order to achieve the optical spectrum laid out in accordance with the first aspect, an appropriate modulation scheme should be selected. In a set of embodiments, a modulation scheme is determined, wherein the modulation scheme is used to generate the phase modulation voltage for modulating a light beam from which the measurement beam and the reference beam are derived;

wherein the modulation scheme comprises the first modulation frequency, the second modulation frequency, the first modulation depth and the second modulation depth;

wherein the interferometric displacement measurement apparatus is arranged to obtain interference intensity data arising from an interference between the measurement beam and the reference beam, the interference intensity data comprising at least one odd intensity band and at least one even intensity band wherein the odd interference intensity frequency bands and even interference intensity frequency bands occur at frequencies given by $f_{j,h}=jf_{m_1}+hf_{m_2}$, wherein $f_{m_1}$ is the first modulation frequency, $f_{m_2}$ is the second modulation frequency, j and k each comprise an integer; and wherein an intensity band is an odd intensity band when the sum of j and h is an odd number and wherein an intensity band is an even intensity band when the sum of j and h is an even number;

the method comprising:

determining a modulation frequency pair comprising the first modulation frequency and the second modulation frequency;

given said modulation frequency pair, determining a modulation depth pair comprising the first modulation depth and the second modulation depth, by:

for each of a plurality of modulation depth pairs:

for each of a plurality of optical path differences:

evaluating the plurality of modulation depth pairs;

determining a first measure representative of the sum of the power of the odd interference intensity frequency bands and a second measure representative of the sum of the power of the even interference intensity frequency bands; for each of the plurality of modulation depth pairs:

determining the lowest first measure representative of the sum of the power of the odd interference intensity frequency bands and the lowest second measure representative of the sum of the power of the even interference intensity frequency bands, from the plurality of optical path differences; and taking the lower of the lowest first measure representative of the sum of the power of the odd interference intensity frequency bands and the lowest second measure representative of the sum of the power of the even interference intensity frequency bands, and selecting one of the plurality of modulation depth pairs, wherein the selected modulation depth pair gives the largest value of said lower measure.

Therefore, the modulation scheme can be determined by determining the first modulation frequency and determining the second modulation frequency which determines the modulation frequency pair. Once a modulation frequency pair has been chosen, a corresponding modulation depth pair can be determined, the modulation depth pair consisting of the first modulation depth and the second modulation depth. A modulation depth pair is chosen by observing the summed even interference intensity frequency bands and the summed odd interference intensity frequency bands at a plurality of optical path differences for a range of optical path differences (OPDs)—e.g. from 1 m to 88 m—for a plurality of modulation depth pairs (i.e. a modulation depth being a combination of a first modulation depth and a second modulation depth).

The first modulation depth may have a value between 0 and 6, e.g. between 0.1 and 3. Similarly, the second modulation depth may have a value between 0 and 6, e.g. between 0.1 and 3.

The smaller of the summed (e.g. power of the) even interference intensity frequency bands and the summed (e.g. power of the) odd interference intensity frequency bands over all of the plurality of optical path differences, preferably has the largest value of any of given modulation depth pair, for that modulation depth pair to be selected for the modulation scheme.

Thus, the smaller of the first measure representative of the lowest sum of the power of the odd interference intensity frequency bands of the plurality of optical path differences and the second measure representative of the (e.g. lowest sum of the power of the even interference intensity frequency bands of the plurality of optical path differences, is evaluated, for each modulation depth pair. This gives a plurality of lower measures of which the largest is selected to use, thus giving the modulation depth pair to be selected for the modulation scheme.

This modulation scheme selection process may be novel and inventive in its own right. Thus when viewed from a second aspect, there is provided a method of determining a modulation scheme for use in an interferometric displacement measurement apparatus;

wherein the modulation scheme is used to generate a time-varying phase modulation voltage for modulating a light beam from which a measurement beam and a reference beam are derived;

wherein the modulation scheme comprises a first modulation frequency, a second modulation frequency, a first modulation depth and a second modulation depth;

wherein the interferometric displacement measurement apparatus is arranged to obtain interference intensity data arising from an interference between the measurement beam and the reference beam, the interference intensity data comprising at least one odd band and at least one even band wherein the odd interference intensity frequency bands and even interference intensity frequency bands occur at frequencies given by $f_{j,h}=jf_{m_1}+hf_{m_2}$, wherein $f_{m_1}$ is the first modulation frequency, $f_{m_2}$ is the second modulation frequency, j and k each comprise an integer; and wherein a band is an odd band when the sum of j and h is an odd whole number and wherein a band is an even band when the sum of j and h is an even whole number;

the method comprising:

determining a modulation frequency pair comprising the first modulation frequency and the second modulation frequency;

given said modulation frequency pair, determining a modulation depth pair comprising the first modulation depth and the second modulation depth, by:

for each of a plurality of modulation depth pairs:

for each of a plurality of optical path differences:

evaluating the plurality of modulation depth pairs;

determining a first measure representative of the sum of the power of the odd interference intensity frequency bands and a second measure representative of the sum of the power of the even interference intensity frequency bands;

for each of the plurality of modulation depth pairs:

determining the lowest first measure representative of the sum of the power of the odd interference intensity frequency bands and the lowest second measure representative of the sum of the power of the even interference intensity frequency bands from the plurality of optical path differences; and taking the lower of the lowest first measure representative of the sum of the power of the odd interference intensity frequency bands and the lowest second measure representative of the sum of the power of the even interference intensity frequency bands, and selecting one of the plurality of modulation depth pairs, wherein the selected modulation depth pair gives the largest value of said lower measure.

In a set of embodiments, the plurality of optical path differences range between approximately 1 m and 88 m, e.g., when the refractive index is 1 (i.e. in a vacuum).

In a set of embodiments, for the modulation depth pair to be chosen, each of the first measure and the second measure must also be greater than a threshold for all of the plurality of optical path differences. In a set of example embodiments, wherein the total power across all interference intensity frequency bands is assumed to be one unit of power, the threshold may be at least 0.1 units of power—e.g. at least 0.16 units of power. If a modulation depth pair is chosen where the lowest measure is determined to be below said threshold, then the range of optical path differences can be adjusted accordingly (e.g. by narrowing or shifting the range of OPDs).

It is described above how the modulation scheme may obtain good displacement measurements for a plurality of OPDs (e.g. over a wide range of OPDs). However, it may sometimes be desirable to measure displacements over a shorter range of OPDs, e.g. with a higher resolution. Therefore, it may be possible to choose a modulation scheme that reduces the range of optical path differences at which the displacement can be measured, e.g. in order to increase the resolution. Therefore, in some embodiments, when a smaller range of distances or optical path differences are required (e.g. for only a sub-set of optical path differences), a modulation scheme may be determined for this smaller range of optical path differences, e.g. in order to obtain an improved resolution.

A digital representation of the phase modulation voltage may be stored in the data acquisition and analysis module, for use by the data acquisition and analysis module. In a set of embodiments, the data acquisition and analysis module provides the phase modulation voltage to the electro-optic modulator—e.g. via a digital to analogue converter.

In a set of embodiments, the data acquisition and analysis module comprises a field-programmable gate array (FPGA). This may allow the user of the interferometric displacement measurement apparatus to program the system with certain control parameters—e.g. parameters related to the phase modulation voltage.

In a set of embodiments, the data acquisition and analysis module comprises a first (analysis) path for processing the odd interference intensity frequency bands and a second (analysis) path for processing the even interference intensity frequency bands. This means that the even interference intensity frequency bands are processed (e.g. lock-in amplified) and summed separately to the odd interference intensity frequency bands. This allows a suitable interferometric quadrature signal to be generated from which the measure representative of the displacement (e.g. the change in optical path difference between the measurement beam and the reference beam) can be determined.

Interference intensity frequency bands of interest ($f_{j,h}$) may be extracted from the interference intensity by lock-in amplification—e.g. using a mixer and a low-pass filter (for each respective band). In a set of embodiments, the data acquisition and analysis module comprises a plurality of lock-in amplifiers, wherein each of the lock-in amplifiers comprise a mixer and a low-pass filter arranged to extract a frequency band of interest ($f_{j,h}$) from the interference intensity by lock-in amplification. In such a set of embodiments, an interference intensity signal received from the photodetector is fed to the data acquisition and analysis module.

In the data acquisition and analysis module a plurality of lock-in amplifiers extract the frequency bands of interest. The signal is passed through mixers where it is mixed with (multiplied with) a multiplier signal having a frequency equal to the frequency of the band the lock-in amplifier is to extract. The output of each mixer may be low-pass filtered. The phase of the multiplier signals may be adjusted using proportional-integral-derivative (PID) controllers to maximise the intensity of the extracted frequency bands of interest (e.g. to maximise the output signal of the low-pass filter). Therefore, PID controllers may be used to adjust the phases of the multiplier signals.

The signal strengths(S) (or powers) that result from lock-in amplification may have the following form:

$$S_{odd,j,h} = \sin\left(2\pi\frac{2x(t)}{\lambda}\right) * A \sum_{\substack{(k_+-k_-)=j \\ (l_+-l_-)=h}} J_{k_+}(\beta_1) J_{k_-}(\beta_1) J_{l_+}(\beta_2) J_{l_-}(\beta_2) \sin\left[\left[(k_+ + k_-)\omega_{m_1} + (l_+ + l_-)\omega_{m_2}\right]\frac{x(t)}{c}\right]$$

$$S_{even,j,h} = \cos\left(2\pi\frac{2x(t)}{\lambda}\right) * A \sum_{\substack{(k_+-k_-)=j \\ (l_+-l_-)=h}} J_{k_+}(\beta_1) J_{k_-}(\beta_1) J_{l_+}(\beta_2) J_{l_-}(\beta_2) \cos\left[\left[(k_+ + k_-)\omega_{m_1} + (l_+ + l_-)\omega_{m_2}\right]\frac{x(t)}{c}\right]$$

Where k and l are again integers and the “odd” equation holds for j+h=odd and the even equation holds if “odd” if j+h=even.

In preferred embodiments, in order to determine the measure representative of the displacement, the frequency spectrum of the time-dependent interference intensity data I(t) is analysed (e.g. by the data acquisition and analysis module) to construct an interferometric quadrature signal.

This quadrature signal generation may be achieved by dividing $S_{odd,j,h}$ and $S_{even,j,h}$ through slowly distance varying terms (i.e. terms varying slowly with distance) which may be extracted by signal processing once every time the OPD changes by half a wavelength. This may yield:

$$S_{odd,norm} = \sin\left(2\pi\frac{2x(t)}{\lambda}\right) \text{ and}$$

$$S_{even,norm} = \cos\left(2\pi\frac{2x(t)}{\lambda}\right).$$

Where $S_{even,norm}$ and $S_{odd,norm}$ now form the (desired) quadrature signal pair.

From the quadrature signal the interferometric phase can be determined $$\phi_{int} = 2\pi\frac{2x(t)}{\lambda}$$

which in turn allows the optical path difference modulo a quarter of a carrier wavelength to be extracted. The interferometric phase $\phi_{int}$ may be monitored (at least twice in every change of $2\pi$) to allow the change of OPD to be tracked.

In this way, from the interferometric quadrature signal, the measure representative of the displacement may be extracted. For example, the displacement may be representative of the change in the longitudinal dimension (or a change in the optical path length e.g. x(t)) of the measurement interferometer which may be extracted from the interferometric quadrature signal—e.g. according to the calculation:

$$2x(t) = \frac{\lambda}{4\pi} \text{ unwrap } (a\tan 2(S_{even,norm}, S_{odd,norm})) + x_0$$

where $S_{even}$ and $S_{odd}$ are the summed and normalised even and odd interference intensity frequency bands respectively and $x_0$ summarises the integer number of half wavelengths in the optical path difference at time t=0 when the measurement of displacement began.

The interference intensity data may be analysed in any suitable way. In a set of embodiments, the interference intensity data is analysed in the data acquisition and analysis module. In a set of embodiments, the measure representative of the displacement is determined by an analysis algorithm. The analysis algorithm may be run in the data acquisition and analysis module.

In a set of embodiments, the data acquisition and analysis module is arranged to carry out an analysis algorithm for determining a change in optical path difference from a time-varying interference intensity signal, the analysis algorithm comprising:

- receiving a time-varying interference intensity signal, derived from interference detected at a photodetector, comprising a plurality of odd interference intensity frequency bands and a plurality of even interference intensity frequency bands;
- extracting each odd interference intensity frequency band using a respective lock-in amplifier;
- summing and normalising the plurality of odd interference intensity frequency bands
- extracting each even interference intensity frequency band using a respective lock-in amplifier,
- summing and normalising the plurality of even interference intensity frequency bands output from the lock-in amplifiers;
- generating a quadrature signal by combining the normalised sum of the odd interference intensity frequency bands and the normalised sum of the even interference intensity frequency bands; and
- calculating the change in optical path difference from said quadrature signal.

This allows the signal from the interferometric displacement measurement apparatus to be analysed so that changes in the optical path difference between the measurement beam and the reference beam can be monitored over time—e.g. using the interference data obtained from the photodetector. Such embodiments allow for the extraction of a quadrature signal from multiple interference intensity frequency bands. This helps to make the technique robust against noise at any (e.g. special) frequency and allows more of the laser power to be used for signal reconstruction (i.e. constructing the quadrature signal). Using the invention large modulation depths can be used to give the desired optical spectrum (i.e. with strong frequency peak amplitudes). The light is also modulated with two modulation frequencies. This means that a lot of the signal power lies in the multiple (e.g. nine) interference intensity bands. In a set of embodiments, there are nine interference intensity frequency bands in total.

In a set of embodiments, the analysis algorithm further comprises proportional-integral-derivative (PID) controllers to maximise the intensity of the (e.g. extracted) frequencies from lock-in amplification.

Displacement techniques according to the state of the art are unable to cope with rapid or large changes of an interference intensity signal envelope. Such rapid envelope changes often occur when the interferometer is used in a tracking device such as a laser tracker or laser tracer. Imperfections of motion tracking feedback loops in existing techniques lead to inevitable intensity variations in the amount of light returned from a reflector. Embodiments of the invention are more tolerant of such rapid changes and, therefore, may help to provide a technique that can track faster objects in real time and with higher resolution. What makes embodiments of the invention more tolerant of such rapid changes is on the one hand that the interference intensity data (signal) is encoded in multiple interference intensity frequency bands, and the frequency bands on which the interference intensity signal is encoded are, typically, at a high frequency compared to the typical frequencies of interference intensity changes. On the other hand, large changes of an interference intensity signal envelope may be tolerated further by using a high dynamic range ADC (e.g. 16 bit) and/or having a widely variable gain on the amplifiers (e.g. with adjustable gain that can be adjusted by up to 60 dB) to adapt to interference intensity signal envelope changes.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE SEVERAL VIEWS OF THE DRAWINGS

Certain preferred embodiments of the invention will now be described, by way of example only, with reference to the accompanying drawings, in which.

DETAILED DESCRIPTION OF THE PRESENT DISCLOSURE

Embodiments of an interferometric displacement measurement apparatus for measuring the changes in optical path difference between a measurement beam and a reference beam will now be described.

Figure 1:
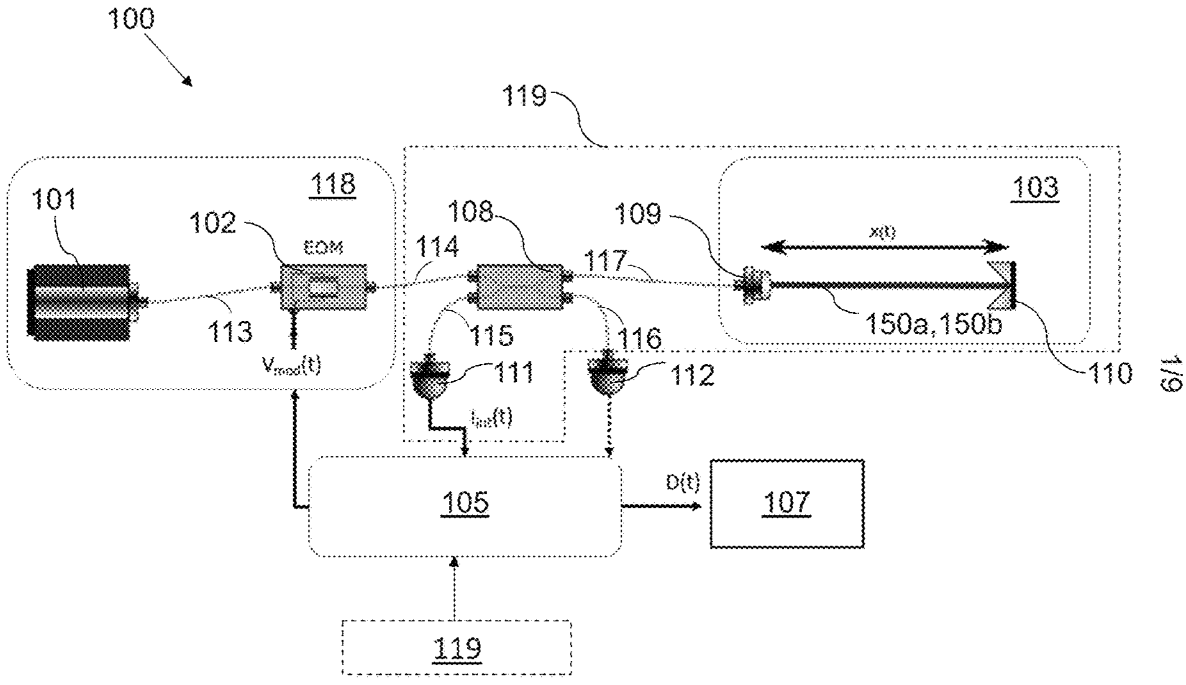
FIG. 1 shows schematically an apparatus according to an embodiment of the invention.

FIG. 1 shows schematically an interferometric displacement measurement apparatus 100 according to an embodiment of the invention. The apparatus 100 shown in FIG. 1 is used to measure the change in the absolute optical path length x(t) of a Fizeau interferometer having a zero-length short arm by determining the change in the optical path difference (OPD) between a measurement beam and a reference beam. The displacement measured by the apparatus 100 may, for example, be caused by the movement of a reflector 110 at one end of a measurement interferometer 103.

The dashed line encloses the elements specific to one measurement 'channel' 119. There may be multiple of these channels (e.g. 119) each comprising a measurement interferometer 103 and a single high bandwidth photodetector (e.g. photodiode) 111. The interferometer 103 and photodetector 111 are connected via a fibre beam splitter 108 and optical fibres 115, 117. All other elements outside of the dashed line are common to many such channels. An optional power monitoring photodetector 112 is also shown in FIG. 1. A light source module 118 is also shown (common to all measurement channels 119) comprising a light source 101 and a modulator 102 connected to the fibre beam splitter 108 by an optical fibre 114. The light source 101 is connected to the modulator 102 by an optical fibre 113.

Each measurement interferometer 103 includes a collimator 109 and a retroreflector 110. The photodetector 111 is connected to a data acquisition and analysis system, common to all measurement channels 119. The data acquisition and analysis system includes a data acquisition and analysis module 105 which is connected to an displacement output module 107 for reading out displacement data D(t) obtained from interference intensity data. The displacement data D(t) that is calculated by the apparatus 100 (from the interference intensity data) may be output by the displacement output module 107 via an A-Quad-B real-time output or via PCIe bus extension to a PC.

Figure 2:
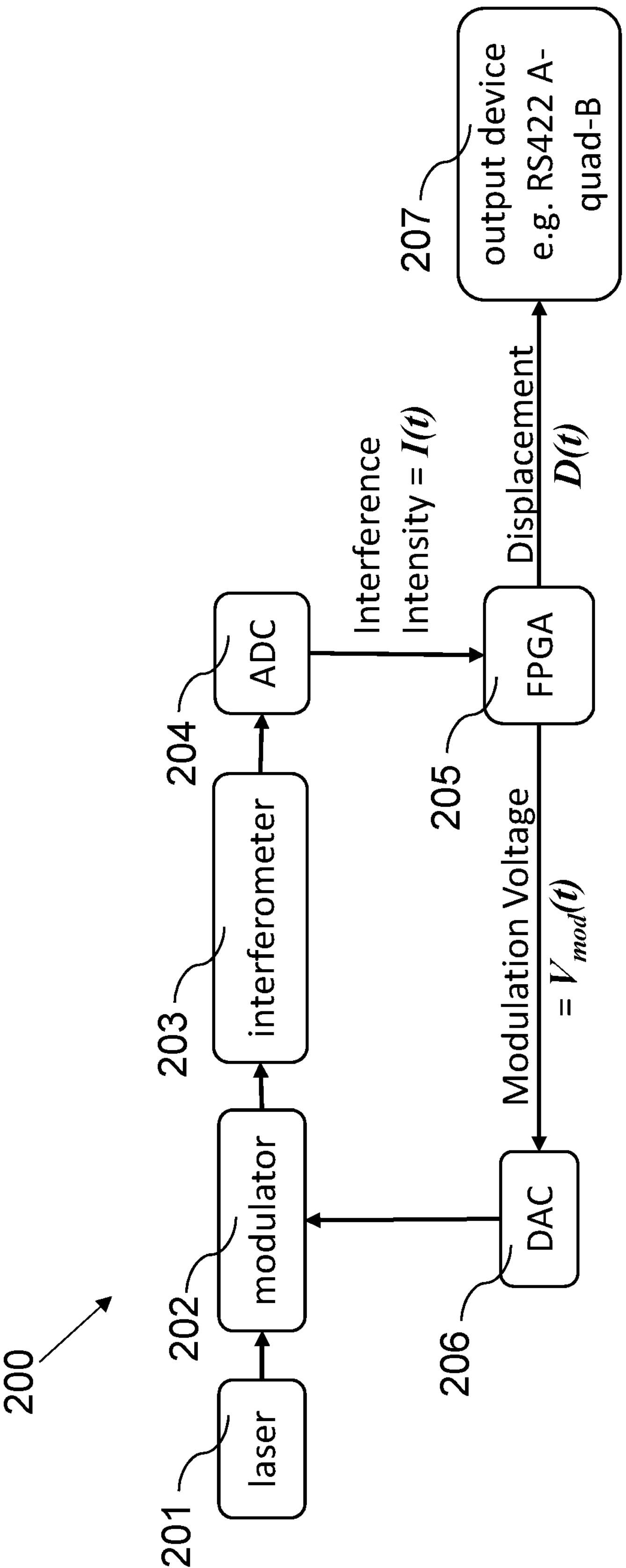
FIG. 2 shows a hardware functional block diagram of an apparatus in an embodiment similar to that shown in FIG. 1.

FIG. 2 shows a hardware functional block diagram of an apparatus 200 according to an embodiment of the invention, similar to the apparatus 100 shown in FIG. 1. In this example, a laser 201 is output to an electro-optic modulator 202 (this pairing corresponds to the light source module 118 of FIG. 1). The modulator 202 receives the modulation voltage $V_{med}(t)$ from a field-programmable gate array (FPGA) module 205 via a digital to analogue converter (DAC) 206. The modulator 202 outputs modulated light to a measurement interferometer 203. The measurement interferometer 203 outputs interference intensity data via an analogue to digital converter (ADC) 204 to the FPGA module 205. The FPGA module 205 of FIG. 1 corresponds to the data acquisition module 105 of FIG. 1. FIG. 2 shows the displacement data calculated at the FPGA module 205 being output to an RS422 A-quad-B output device 207 (corresponding to the displacement output module 107 of FIG. 1).

Figure 3:
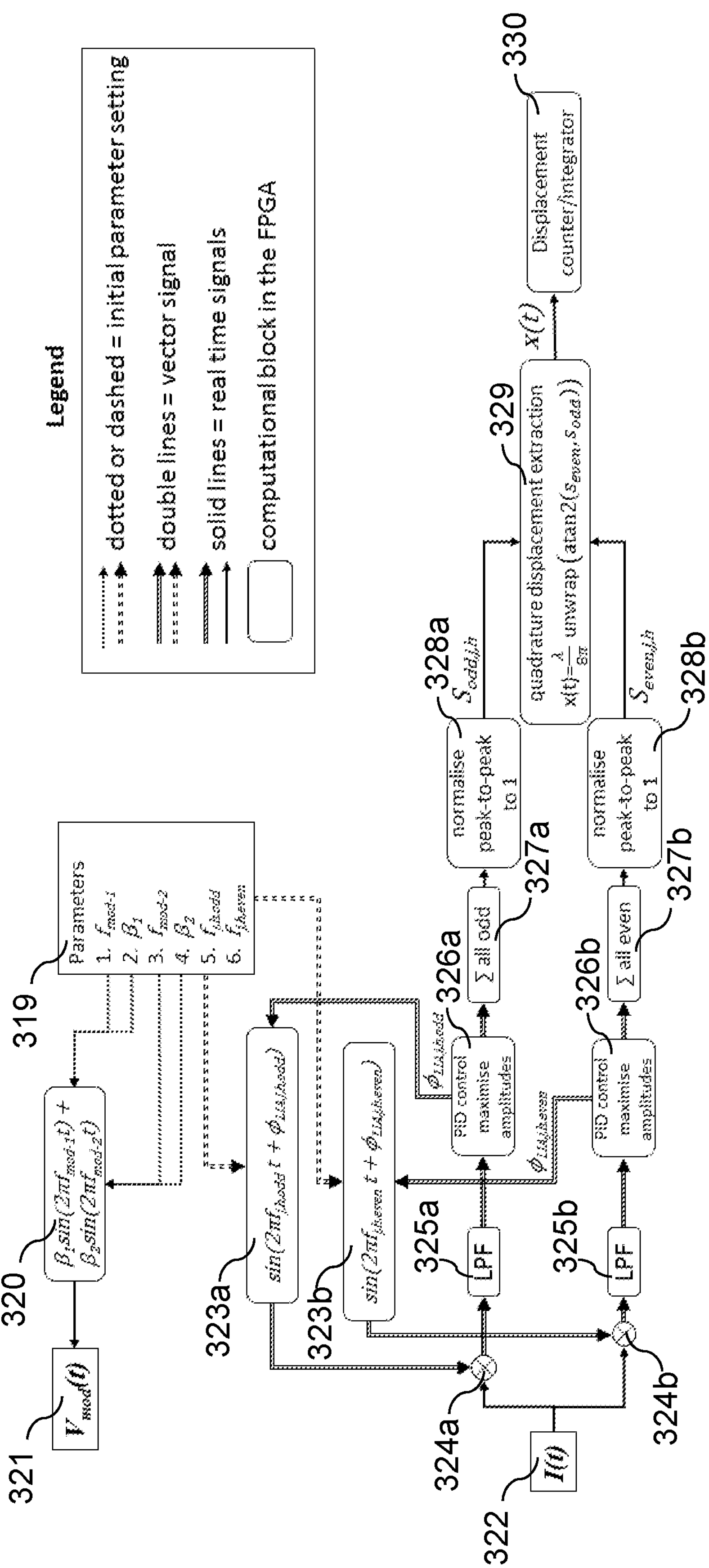
FIG. 3 shows a flow chart of the process used to operate apparatus in accordance with embodiments of the invention.

FIG. 3 shows in more detail the analysis process occurring inside the FPGA module 205 of FIG. 2 which is used to obtain the displacement data. A legend shows that: dotted or dashed lines indicate an initial parameter setting; double lines indicate vector signals (signals of multiple values at each time); solid lines indicate real time signals; and boxes indicate computational blocks in the FPGA module 205.

The operation of the measurement apparatus 100 shown in FIG. 1 and the measurement apparatus 200 shown in FIG. 2 will now be explained with reference to FIGS. 1, 2 and 3.

To illuminate the measurement interferometer 103, 203 the (polychromatic) light source module 118 generates a polychromatic modulated light beam. How the light source module 118 generates a polychromatic modulated light beam will now be described.

The light source (e.g. laser source) 101, 201 generates a light beam having a constant frequency ($v_c$) which is transmitted along an optical fibre 113 to an electro-optic modulator 102, 202. The light is modulated at the electro-optic modulator 102, 202 according to a modulation frequency $V_{mod}(t)$. The modulated light beam comprises sidebands having peaks at a range of frequencies within the sensitivity range of the photodetector 111.

The modulated light beam is provided to the fibre beam splitter 108 of each measurement channel (e.g. 119) via an optical fibre 114. Another optical fibre 117, extending between the fibre beam splitter 108 and the collimator 109 of the measurement interferometer 103, provides the modulated beam to the collimator 109 of the interferometer 103.

Some of the polychromatic light from the light source module 118 is reflected at a reference surface (i.e. a beam-splitting surface) back toward the photodetector 111. This reflected light forms the reference beam. In this example, the reference surface is near the collimator 109—at the end of the 'launch' optical fibre 117. The light that is transmitted through the reference surface forms the measurement beam and is directed to the retroreflector 110. Thus, the measurement beam travels a further optical path length than the reference beam—i.e. this further optical path length is equivalent to 2x(t), where x(t) is the optical path length between the reference surface (not shown) and the retroreflector 110. The extra optical path length travelled by the measurement beam is related to the extra distance travelled d by $x(t)=\eta d$, where n is the refractive index of the medium.

The measurement beam 150 is transmitted from the end of the optical fibre 117 via the collimator 109 at one end of the measurement interferometer 103, 203 toward the (e.g. corner-cube) retroreflector 110 at the other end of the measurement interferometer 103, 203. At the retroreflector 110, a reflected measurement beam 150*b* is returned substantially parallel to the direction of the incident modulated light beam 150*a*.

The interference intensity $I_{int}(t)$ (shown in FIG. 1 as lint (t)) is detected with a single high bandwidth photodetector 111. FIG. 1 shows that the intensity data I(t) is output to the data acquisition and analysis module 105. As shown in FIG. 2, the intensity data I(t) is fed to the FPGA module 205 via the ADC 204. The frequency spectrum of the interference intensity I(t) is analysed in real-time to construct an interferometric quadrature signal. The interferometric quadrature signal comprises two normalised sums of signals.

The first is a normalised sum of "odd" signals as extracted from the interference intensity signal by the algorithm blocks 324*a* to 328*a* shown in FIG. 3. The second is a normalised sum of "even" signals as extracted from the interference intensity signal by the algorithm blocks 324*b* to 328*b* shown in FIG. 3. A signal is considered even if j+h is equal to an even whole number or odd if j+h is equal to an odd whole number. The frequency of the signals in processing blocks 323*a* or 323*b* are $f_{j,h}=jf_{m_1}+hf_{m_2}$.

The two normalised sums are input to a quadrature displacement extraction block 329 which computes the wrapped displacement. A wrapped displacement is the displacement modulo a quarter of the wavelength of the laser 101, 201 in FIGS. 1 and 2.

This wrapped displacement signal is "counted" or "integrated" or "unwrapped" over a desired time period. From this, the displacement that occurred in this time period can be determined without ambiguity. The mathematical basis for the construction of the interferometric quadrature signal will be explained in more detail later.

Optionally, the light source power is monitored at the additional photodetector 112 to be able to correct for any changes in the interference intensity I(t) which are caused by power fluctuations. Power measurements may be helpful if there are any doubts regarding the power stability of the light source that is used.

The optical frequency spectrum of the (polychromatic) light source module 118 comprises two sets of equally spaced, narrow peaks at frequencies all in the sensitivity range of the photo diode 111, where:

i. the two sets of optical frequencies have a respectively different frequency spacing $\Delta v_1 \neq \Delta v_2$;

ii. the central optical frequencies of the two sets are the same and are referred to as $v_c$;

iii. $v_c$ is known in absolute terms with an uncertainty less than the desired displacement measurement uncertainty;

iv. the frequency spacings $\Delta v_i$ are stable in time and their residual time variations (if any) are available/known in real time by the analysis algorithm performed within the data acquisition and analysis module 105;

v. the two frequency spacings $\Delta v_1$ and $\Delta v_2$ should form a near-irrational ratio;

vi. none of the differences between any two optical frequencies emitted by the polychromatic light source module 118 are smaller than half of the largest expected Doppler shift, of any optical frequency, caused by the motion of the retroreflector 110 in the measurement interferometer 103, 203—(here, "expected" refers to the Doppler shift that occurs when the retroreflector moves at the maximum tolerable speed $v_{max}$ for which the interferometric measurement apparatus 100, 200 is designed);

vii. all optical frequencies in both sets of optical frequencies are phase locked against each other—meaning that all phase differences between any two optical frequency components/peaks are periodic functions of time; and viii. the larger of the two optical frequency spacings ($\Delta v_1$ or $\Delta v_2$) is below half the Nyquist frequency $v_{Nyq}$ of the data acquisition and analysis module 105 (or more specifically, the Nyquist frequency of the ADC 204 of FIG. 2) used to record the interference.

The light spectrum described above can be realised by modulating a light beam of frequency $v_c$ by applying a phase modulating voltage $V_{mod}(t)$ (sometimes referred to as V(t)) to an electro-optic modulator 102, 202 which receives the light beam from the light source 101, 201.

The phase modulation voltage $V_{mod}(t)$ is carried to the electro-optic modulator 102, 202 from the data acquisition and analysis module 105 (or from the FPGA 205 via the DAC 206 as shown in FIG. 2). For obtaining the modulated light, generating a light beam with a frequency-stabilised laser source (i.e. the light source) 101, 201 of known and traceable absolute optical frequency $v_c$ is important.

This light is electro-optically phase-modulated by driving the electro-optical modulator 102, 202 with a modulation voltage of the following form:

$$V_{mod}(t) = V_1\sin(\omega_{m1}t) + V_2\sin(\omega_{m2}t)$$

where $\omega_{m1}=2\pi f_{m1}=2\pi\Delta v_1$ and $\omega_{m2}=2\pi f_{m2}=2\pi\Delta v_2$ are the circular modulation frequencies which correspond to the optical frequency spacings ($\Delta v_1$, $\Delta v_2$) specified above.

The electro-optic phase modulator 102, 202 has a specific modulation efficiency and produces a phase modulation of modulation depth $\beta_i$ if it is driven with a voltage $V_i$. The modulation depth $\beta$ of a phase modulated signal is defined abstractly by defining the amplitude A(t) of a phase modulated signal of unmodulated angular frequency $\omega_c=2\pi v_c$ and phase $\phi_c$ as follows:

$$A(t) = A_0\cos(\omega_c t + \phi_c + \beta\sin(\omega_m t + \phi_m))$$

where $\omega_m$ and $\phi_m$ are the modulation frequency and phase and $A_0$ is the amplitude of the unmodulated wave.

Increasing the modulation depth $\beta_i$ increases the number of sidebands (frequency peaks) which contribute significantly to the spectrum of the modulated light. Therefore, the first and second modulation depths ($\beta_1$ and $\beta_2$) and first and second modulation frequencies ($f_{m2}$ and $f_{m2}$) may be chosen to produce the desired optical spectrum described herein.

The scalar optical amplitude (magnitude of the electrical field) of an electromagnetic wave, modulated in the above manner, which has travelled from the light source module 118 (at time t=0) through a path x taking time t in a medium with speed of light c has the following form:

$$\begin{aligned} E(t, x) &= E_0\cos\left(\begin{matrix}\omega_c\left[t - \frac{x}{c}\right] + \phi_c + \beta_1\sin(\omega_{m_1}t + \phi_{m_1}) + \\ \beta_2\sin(\omega_{m_2}t + \phi_{m_2})\end{matrix}\right) \\ &= E_0\sum_{k,l\in\mathbb{Z}} y_{k,l}(t, x) \end{aligned}$$

$$y_{k,l}(t, x) = J_k(\beta_1)J_l(\beta_2)\cos\left[(\omega_c + k\omega_{m_1} + l\omega_{m_2})\left[t - \frac{x}{c}\right] + \phi_c + k\phi_{m_1} + l\phi_{m_2}\right]$$

where $J_k(\beta_1)$ and $J_l(\beta_2)$ are the $k^{th}$ and $l^{th}$ Bessel functions of the first kind of the two modulation depths $\beta_1$ and $\beta_2$ and k and l run over all integer numbers. $E_0$ is the electrical field strength of the unmodulated wave.

Two such modulated waves $E_{ref}$ and $E_{meas}$ are generated at the beam splitter (i.e. the end of the 'launch' optical fibre 117) from the wave generated initially at the light source module 118. These two waves interfere at time t on the photodetector 111 (or photodiode). Both waves have travelled a common path length x, and the measurement wave $E_{meas}$ has travelled an additional path length 2x(t) (note all paths are taken to be optical paths which are the product of the geometrical paths with the refractive index of the medium in which the path is taken). The optical path difference between the reference wave (reference beam) and the measurement wave (measurement beam) is equivalent to 2x(t) and its changes can be calculated from the interferometric phases obtained from the interference intensity data.

The apparatus 100, 200 can measure changes in this optical path difference (OPD) (e.g. over time). The scalar intensity of such an interference pattern is the square of the sum of these two amplitudes ($E_{ref}$ and $E_{meas}$) followed by time averaging (over the response time of the photodetector).

The analysis of the interference intensity data measured by the interferometric measurement apparatus 100, 200 will now be described with reference to FIG. 3.

Interfering two waves with multiple frequency components (or peaks) that are all phase locked relative to each other means the interference intensity is not going to be constant in time but will instead show sinusoidal oscillations with frequencies corresponding to the differences between any pair of frequency components. The oscillations of interference intensity corresponding to the sums of two optical frequency components would oscillate at approximately twice the optical carrier frequency ($v_c$). These oscillations are very fast indeed and will have been averaged away by the detector response. The following shows analytic expressions for the frequency bands that will exist in the time dependent interference intensity. These bands appear at the following frequencies:

$$f_{j,h} = jf_{m_1} + hf_{m_2}$$

where j and h run over all integers and $f_{m_1}$ and $f_{m_2}$ are the above mentioned two modulation frequencies (but only positive $f_{j,h}$ are to be considered). These interference intensity frequency bands are distinguished as either being "odd" if j+h=odd or being "even" if j+h=even.

The flowchart of FIG. 3 shows the odd interference intensity frequency bands and the even interference intensity frequency bands separated into two separate paths i.e. an odd path and an even path. This shows that they can be summed and normalised separately, so that their normalised sums can be used for constructing the quadrature signal.

A lock-in amplification process is used to extract the "strengths" or "amplitudes" of each of these interference intensity frequency bands. Lock-in amplification allows for the extraction of a selected signal component at a particular frequency and phase from a noisy environment. In FIG. 3, the lock-in amplifiers comprise the mixers 324$a,b$, multiplier signals 323$a,b$, low-pass filters 325$a,b$ and proportional-integral-derivative (PID) controllers 326$a,b$.

The interference intensity data (I(t)) is fed into mixers 324$a$, 324$b$. The mixers 324$a$, 324$b$ multiply each intensity signal (I(t)), with a sinusoidal multiplier signal (see 323$a$ and 323$b$ of FIG. 3) having a frequency equal to the frequency of the band the lock-in amplifier should extract. The multiplier signals have phases $\phi_{LIA,j,h}$. The mixers 324$a$, 324$b$ utilise these odd and even sinusoidal multiplier signals 323$a$, 323$b$.

After lock-in amplification each resultant signal is passed through a low pass filter 325$a$, 325$b$. The pass-band of each low pass filter 325$a$, 325$b$ is set to the maximum Doppler shift that a measurement wave could incur during its reflection by the moving retroreflector 110 of the measurement interferometer 103.

The passband frequency of each low pass filter 325$a$, 325$b$ must also be smaller than the difference between any of the intensity band frequencies ($f_{j,h}$). The multiplier signals phases $\phi_{LIA,j,h}$ are tuned by PID controllers 326$a$, 326$b$ to a value that maximises the output signal of the low pass filters 325$a$, 325$b$.

The signal strengths extracted by such a lock-in amplifier are going to be rapidly sinusoidally or cosinusoidally dependent on the OPD 2x(t) with a short period of half the optical carrier wavelength. They are also modulated by terms that vary slowly with the OPD, over much longer distances, which are linear combinations of the two modulation wavelengths.

The signal strengths(S) that result from this lock-in amplification (at 324$a$, 324$b$) have the following mathematical form:

$$S_{odd,j,h} = \sin\left(2\pi\frac{2x(t)}{\lambda}\right) * A \sum_{\substack{(k_+-k_-)=j \\ (l_+-l_-)=h}} J_{k_+}(\beta_1) J_{k_-}(\beta_1)J_{l_+}(\beta_2)J_{l_-}(\beta_2)\sin\left[\left[(k_++k_-)\omega_{m_1} + (l_++l_-)\omega_{m_2}\right]\frac{x(t)}{c}\right]$$

$$S_{even,j,h} = \cos\left(2\pi\frac{2x(t)}{\lambda}\right) * A \sum_{\substack{(k_+-k_-)=j \\ (l_+-l_-)=h}} J_{k_+}(\beta_1) J_{k_-}(\beta_1)J_{l_+}(\beta_2)J_{l_-}(\beta_2)\cos\left[\left[(k_++k_-)\omega_{m_1} + (l_++l_-)\omega_{m_2}\right]\frac{x(t)}{c}\right]$$

Where k and l are again integers and the "odd" equation holds for j+h=odd and the even equation holds if "odd" if j+h=even.

If only a single modulation frequency were to be chosen, as opposed to a first and second modulation frequency in accordance with embodiments of the invention, then the slow terms would go to zero at certain fixed OPD values. This would make it impossible to measure the OPD changes at these distances and thus would limit the range of possible distances at which the apparatus 100, 200 could measure. If, however, the modulation frequencies ($f_{m_1}$ and $f_{m_2}$) and modulation depths ($\beta_1$ and $\beta_2$) are chosen carefully, the slow envelope terms will not all go to zero at the same time in general.

The Applicant has determined a suitable modulation scheme, i.e. a set of frequencies and modulation depths, which give rise to no zeros in the envelope terms from distances >0.29 m up to a distance of approximately 44 m (at distance=0 m these terms all disappear for all modulation schemes). The modulation scheme may be varied, however, by finding the best modulation scheme for a different range of distances. The range of 0.29 m to 44 m is only one particular range that the Applicant has determined a modulation scheme for, out of a continuum of ranges for which it could be done.

These modulation frequencies are extractable given the sampling speed and Nyquist frequency of the ADCs (e.g. 204) used in the embodiments described herein.

A quadrature signal can be extracted by summing of all odd signals (at 327$a$) and summing of all even signals (at 327$b$). Alternatively, the quadrature signal could be extracted from every odd and even pair.

From this quadrature signal the interferometric phase $$\phi_{int} = 2\pi\frac{2x(t)}{\lambda}$$

can be determined. This allows the OPD modulo a quarter of a carrier wavelength to be reconstructed. If $\phi_{int}$ is kept track of fast enough (at least twice in every change of $2\pi$) the change in the OPD can continuously be measured.

This quadrature signal generation is achieved by dividing $S_{odd,j,h}$ and $S_{even,j,h}$ through their slow varying terms. These slowly varying terms can be extracted by signal processing once every time the OPD changes by half a wavelength. This division yields:

$$S_{odd,norm} = \sin\left(2\pi\frac{2x(t)}{\lambda}\right) \text{ and}$$

$$S_{even,norm} = \cos\left(2\pi\frac{2x(t)}{\lambda}\right).$$

From there, the change in OPD modulo $$\frac{\lambda}{4}$$

is extracted as follows:

$$\begin{aligned} 2x(t) &= \frac{\lambda}{4\pi}\text{atan2}(S_{even,norm}, S_{odd,norm}) + \frac{n\lambda}{2} - \frac{\lambda}{4\pi}\phi \\ &= \frac{\lambda}{4\pi}\ \text{unwrap}\ (\text{atan2}(S_{even,norm}, S_{odd,norm})) + x_0 \end{aligned}$$

In the above expression the term $$\frac{\lambda}{4\pi}\phi$$

accounts for a potenual common phase offset of $S_{odd,norm}$ and $S_{even,norm}$ from a sin and cos signal pair and $x_0$ summarises the unknown integer number of half wavelengths in the OPD.

The frequency spectrum of the resultant interference intensity has been described above. A modulation scheme comprising the two modulation frequencies and modulation depths must be devised in order to generate such an optimal interference intensity frequency spectrum. The method behind determining a suitable modulation scheme is described below.

Selecting the Modulation Frequencies

For generating a suitable phase modulation voltage, it is necessary to determine a first modulation frequency ($f_{m_1}$) and a second modulation frequency ($f_{m_2}$). A suitable modulation frequency pairing is necessary to generate an intensity spectrum which satisfies the following criteria:

i. The frequency bands in the interference intensity spectrum—comprising harmonics of both modulation frequencies as well as their sum and difference frequencies (i.e. $f_{j,n}=jf_{m_1}+hf_{m_2}$)—should be evenly distributed across the entire resolvable frequency space up to one maximum Doppler shift below the Nyquist frequency of the apparatus 100, 200 (e.g. the digitiser) and separated from each other by at least twice the maximum Doppler shift. This allows a maximum (e.g. the maximum expected) amount of Doppler shift to occur before the Doppler splitting of neighbouring bands causes them to overlap or become aliased.

Frequency bands above the Nyquist frequency would be aliased down into base band, however, these can be removed by a strong anti-aliasing filter (AAF). The anti-aliasing filter does not only have to remove aliased noise from the base band but it may also have to suppress frequency bands of significant power without distorting the phase near the Nyquist frequency. It is therefore advisable to keep the maximum interference intensity band frequency below the Nyquist frequency less the maximum Doppler shift to allow the filter to roll off. Thus relaxing the requirements on the anti-aliasing filter.

ii. The frequencies on which the interference intensity frequency bands are centred ($f_{j,h}$) must be unique, i.e. so that all odd combinations of j and h give frequencies different from all even combinations of j and h. This ensures that odd and even interference intensity frequency bands can be separated for later use in quadrature signal generation. In other words, odd interference intensity frequency bands must not 'fall on' even interference intensity frequency bands.

iii. Higher modulation frequencies allow a faster onset of power in the lowest band as the OPD rises from zero. To allow for measurement at minimal distances one of the modulation frequencies should be as large as possible whilst still generating at least one harmonic sufficiently (see point i) below the Nyquist frequency. As the Nyquist frequency is 62.5 MHz and the targeted maximum Doppler shift is 1.3 MHz (for 1 m/s motion speed) the maximum value of the larger of the two modulation frequencies is $f_{mod\text{-}max}$=(62.5−1.3)/2=30.6 MHz. To allow the anti-aliasing filter to roll off without affecting the first harmonic (e.g. of 27 MHz) the first modulation frequency is chosen to be below this value—i.e. $f_{m_1}$~27 MHz.

iv. Once $f_{m_1}$ is chosen, the above criteria can be used to find $f_{m_2}$~21 MHz which gives 20 frequency bands that range between 3 MHz-60 MHz with a frequency spacing of 3 MHz.

v. Not all of the frequencies in the above range are going to have significant and therefore useful amplitudes, because multiple combinations of j and h can contribute to a given frequency in the above list, and hence may partially cancel each other out (e.g. having opposite sign amplitudes). The severity of cancellations depends also on the modulation depths ($\beta_1$ and $\beta_2$). The choice of the modulation depths (which determine the modulation voltage) is explained below.

vi. For the 21 MHz and 27 MHz scheme (and the selected modulation depths shown below) there are a total of 9 significant bands left. The odd bands are centred at 15 MHz, 21 MHz, 27 MHz and 33 MHz and the even bands are centred at 6 MHz, 12 MHz, 42 MHz, 48 MHz and 54 MHz.

vii. The effect of cancellations can be dramatically different for various modulation frequency pairs. One particularly extreme example of band power cancellations is $f_{mod\text{-}1}$=30 MHz and $f_{mod\text{-}2}$=18 MHz. This pair generates perfect frequency spacing, but because the frequencies are related to each other by a simple fraction (5/3) this pair results in significant cross-cancellation and consequentially a much worse quadrature signal at most distances.

Selecting the Modulation Depths

Given a certain modulation frequency pair (e.g. $f_{m1}$~27 MHz and $f_{m2}$~21 MHz), a modulation depth pair ($\beta_1$, $\beta_2$) are chosen which generate a suitable quadrature signal anywhere between a minimum distance (e.g. 0.4 m) and a maximum distance (e.g. 44 m)—e.g. giving a nominal distance range of the interferometric measurement apparatus 100, 200 of between approximately 0.4 m and 44 m.

Figure 4:
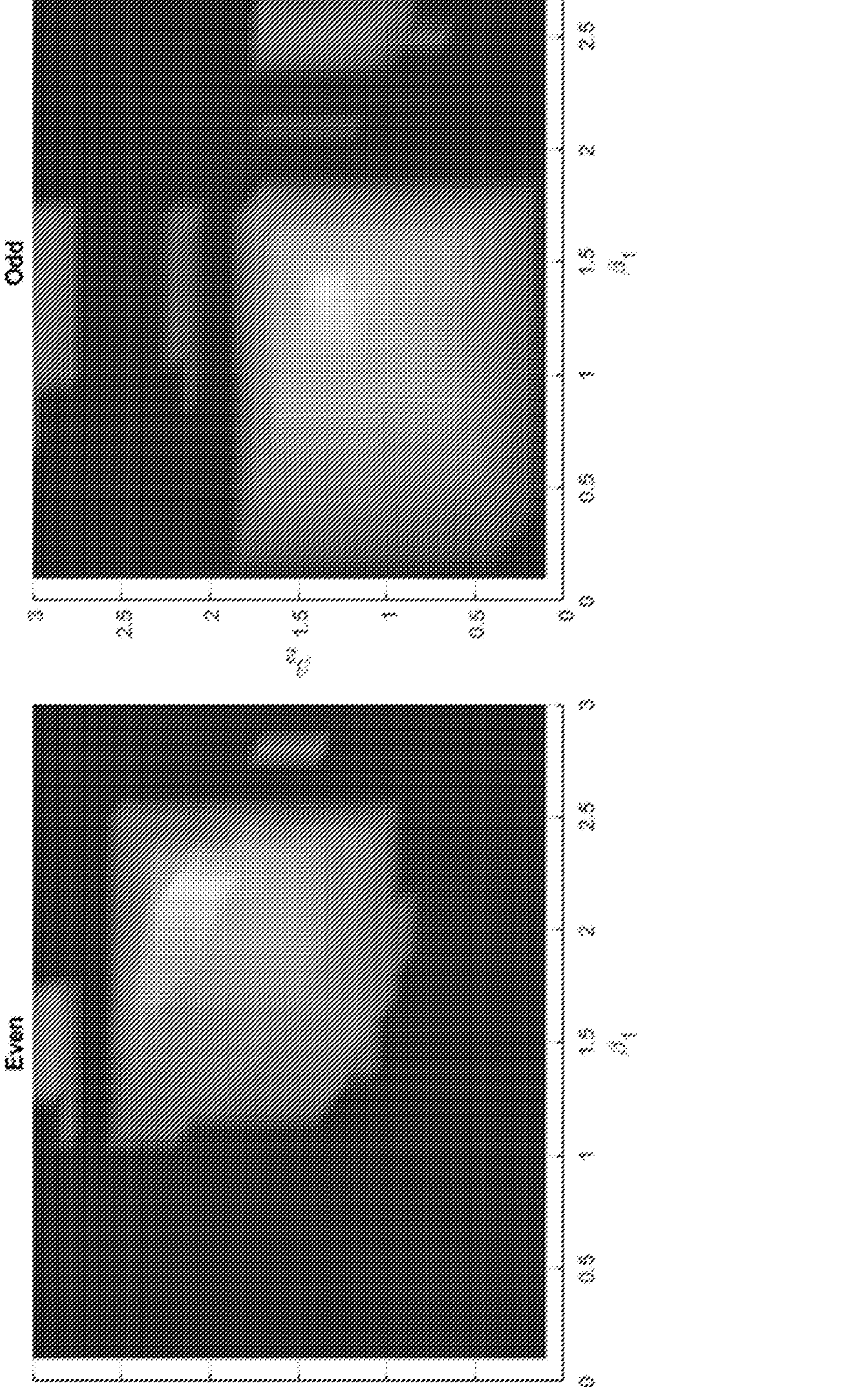
FIG. 4 shows two greyscale plots that demonstrate how the choice of a first and second modulation depth affects the power of summed even interference intensity frequency bands and summed odd interference intensity frequency bands.
Figure 5:
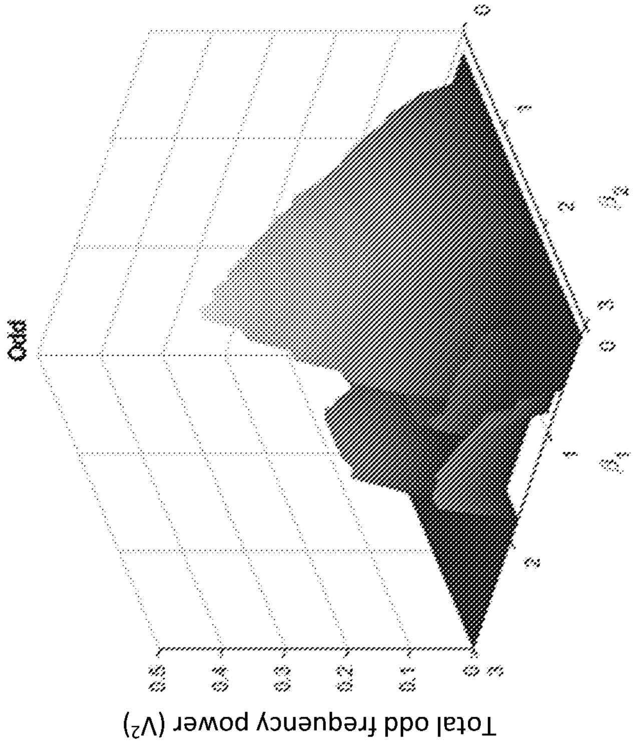
FIG. 5 shows three-dimensional plots corresponding to the plots shown in FIG. 4.
Figure 5:
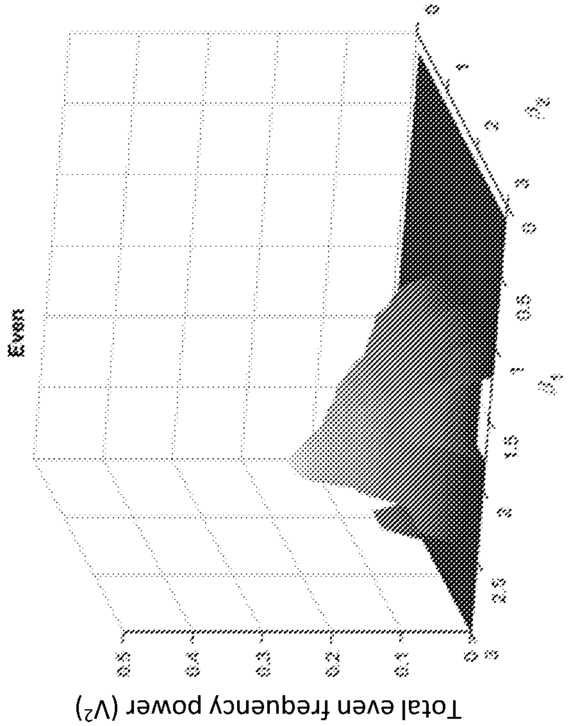

The two variables of interest, which help to determine if any given modulation depth pair generate a suitable quadrature signal, are the sum of all the odd interference intensity bands and the sum of all the even interference intensity bands. The Applicant has evaluated these sums for all distances in the nominal distance range—e.g. 0.4 m to 44 m. For any given pair ($\beta_1$, $\beta_2$) the smallest odd and even sum that occurs in the nominal distance range is recorded. These smallest sums are then plotted as a function of ($\beta_1$, $\beta_2$). FIG. 4 and FIG. 5 show these plots for a range of $\beta_1$ and $\beta_2$—i.e. between 0 and 3.

In particular, FIG. 4 shows a plot of the lowest summed frequency powers for the even bands (left) and the odd bands (right) for distances ranging from 0.5 m to 44 m. It can be seen from the axes of the plot how different values of $\beta_1$ and $\beta_2$ affect the power of the weakest bands. The plot is shown in greyscale. Lighter areas of each plot indicate regions of high summed power and darker areas indicate regions of low summed power.

FIG. 5 shows a 3-dimensional view of the 2-dimensional maps shown in FIG. 4. Similarly to FIG. 4, FIG. 5 shows a plot of the lowest summed powers for the even bands (left) and the odd bands (right) for the same range of OPDs. It can be seen that the even band sums give a generally lower power values compared to the odd band sums, as shown by the vertical extent of the plots in FIG. 5.

Figure 6:
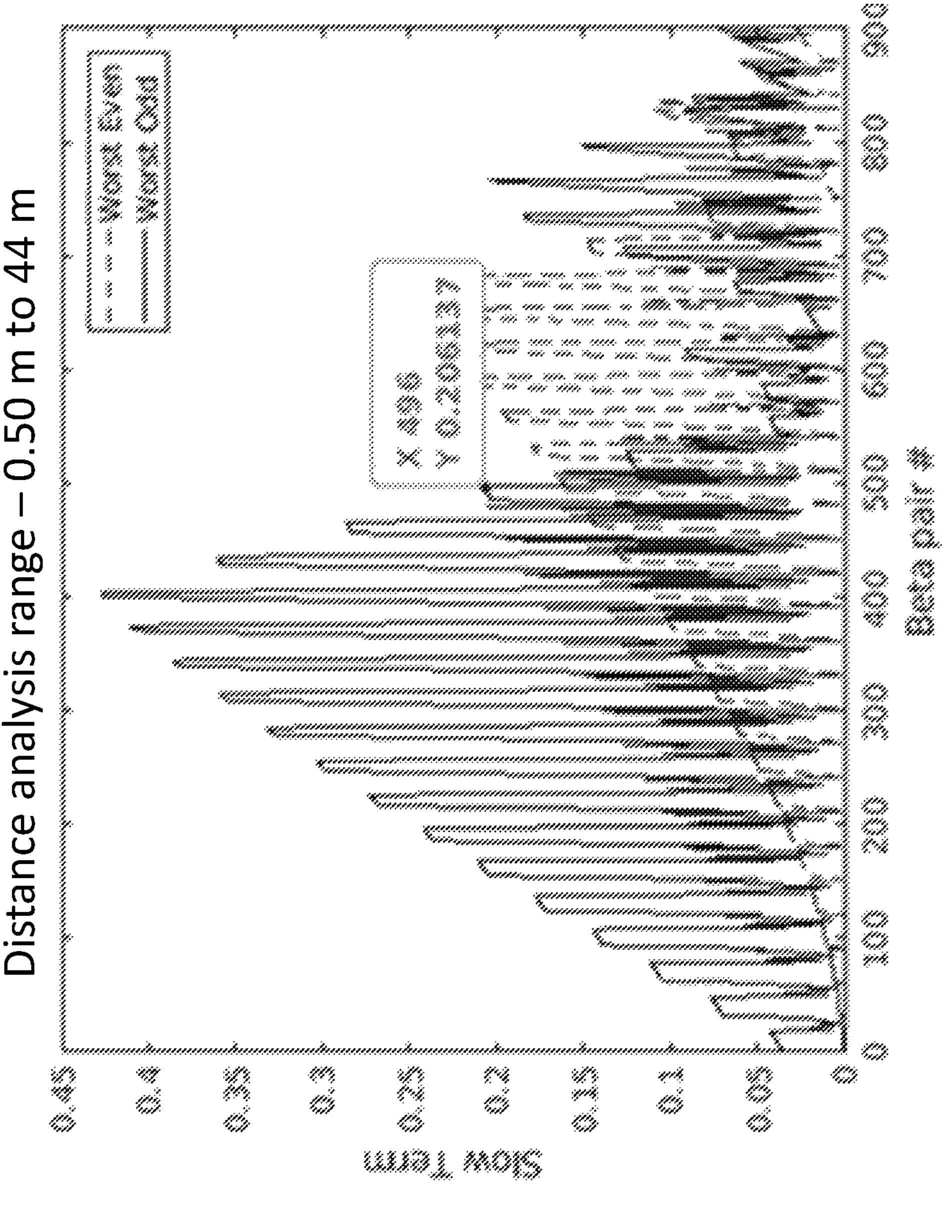
FIG. 6 shows a plot overlaying the lowest powers of summed even interference intensity frequency bands and summed odd interference intensity frequency bands for a distance range of 0.5 m to 44 m and a range of different modulation depth pairings.

FIG. 6 shows a one dimensional representation of the weakest sums of even and odd interference intensity frequency band powers versus the enumerated modulation depth pairs ($\beta_1$, $\beta_2$) shown in FIGS. 4 and 5.

The graph of FIG. 6 shows the minimum band sum power (slow term) across all $\beta_1$ and $\beta_2$ combinations between 0.1 and 3 stepped at 0.1 intervals considering a range of distances from 0.5 m to 44 m. In FIGS. 6 to 9, 'distance' is the length of the measurement interferometer—e.g. the distance between the beam splitter and the reflector in the measurement interferometer, which is approximately half the optical path difference.

Figure 7:
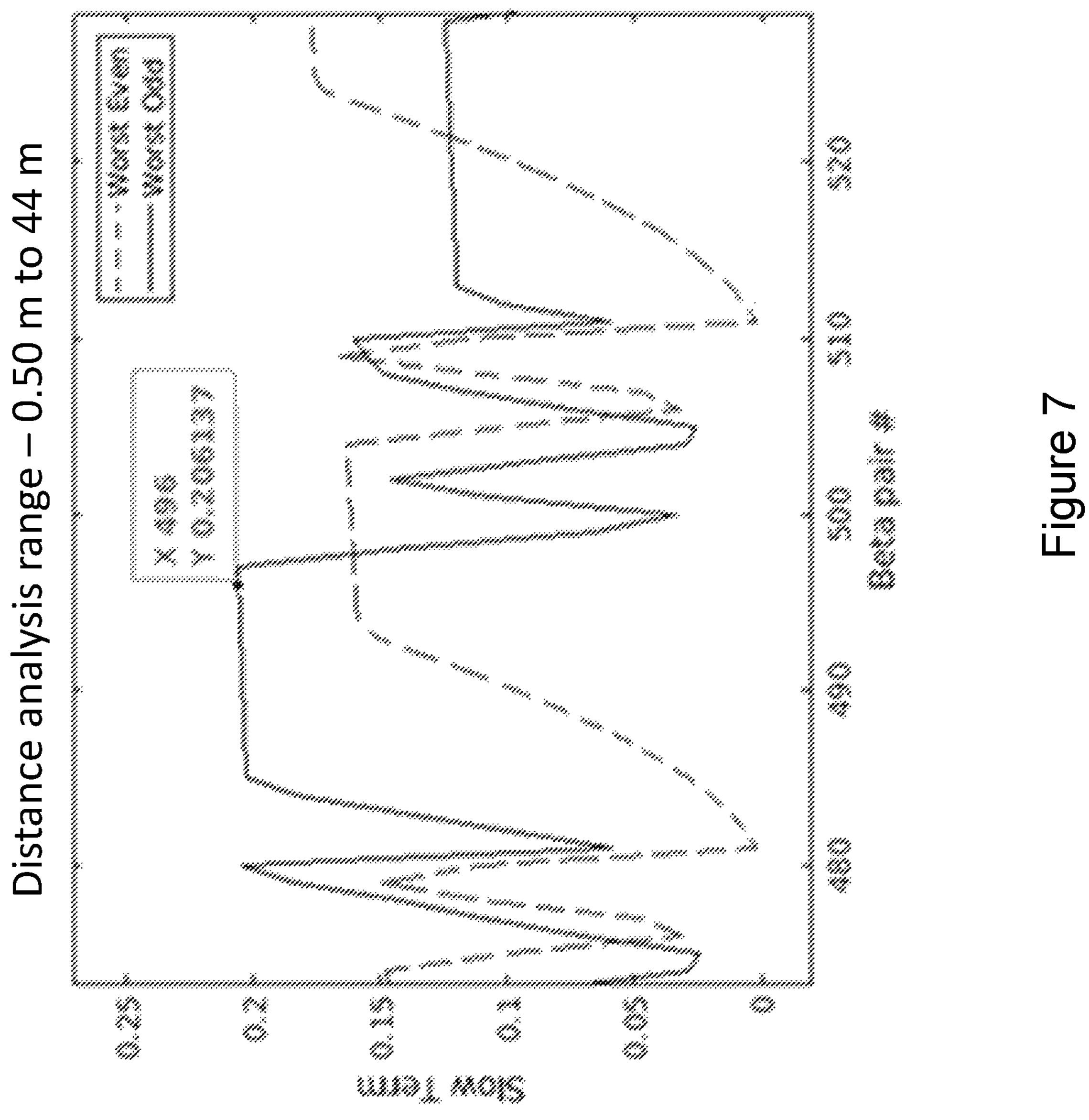
FIG. 7 shows a region of interest of the plot of FIG. 6.

FIG. 7 shows the graph of FIG. 6, but zoomed into the region of interest where the smaller of the minimal band power of the odd and even bands is largest across all modulation depth pairs. This corresponds to a preferred modulation depth pair of $\beta_1$=1.7 and $\beta_2$=1.6 for a given distance range of 0.5 m to 44 m.

Figure 8:
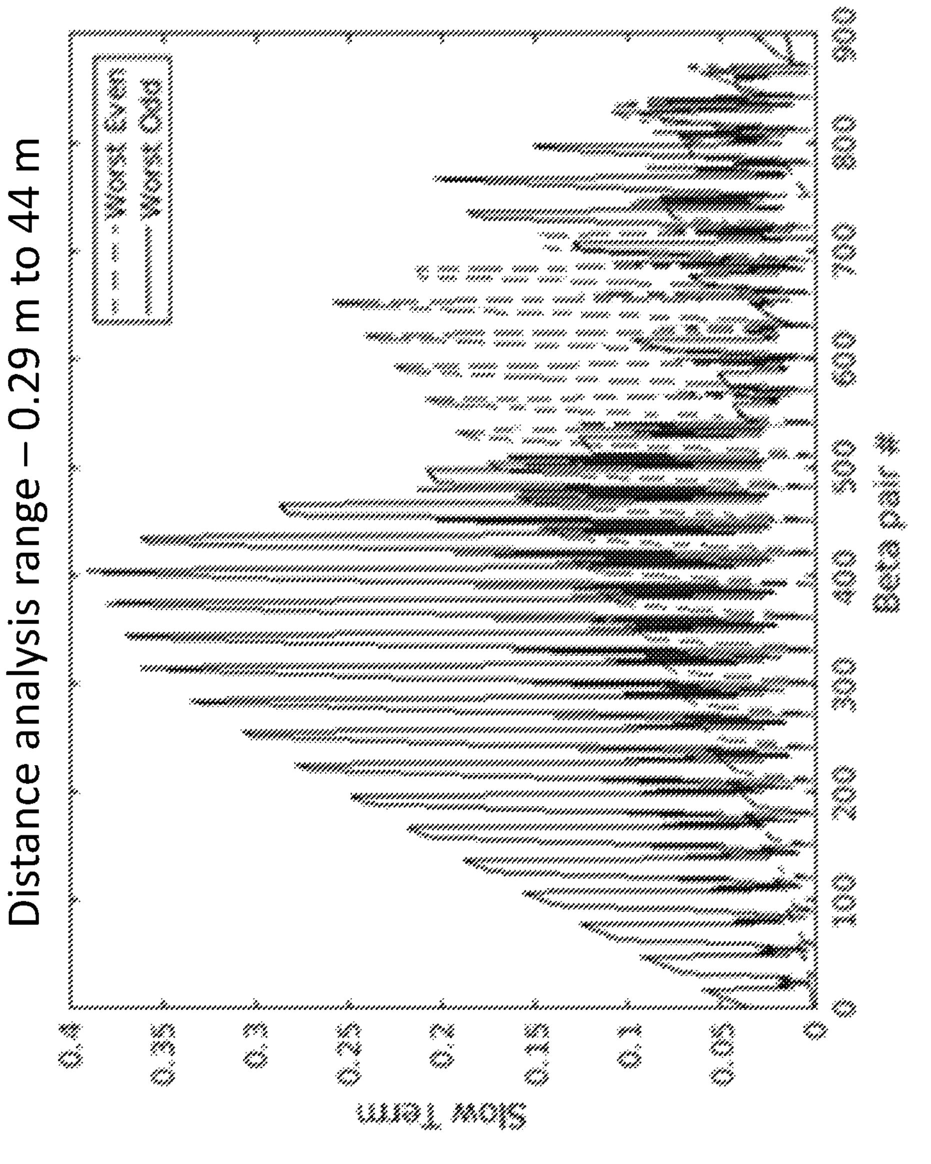
FIG. 8 shows a plot similar to FIG. 6 with a smaller minimum distance (0.29 m)
Figure 9:
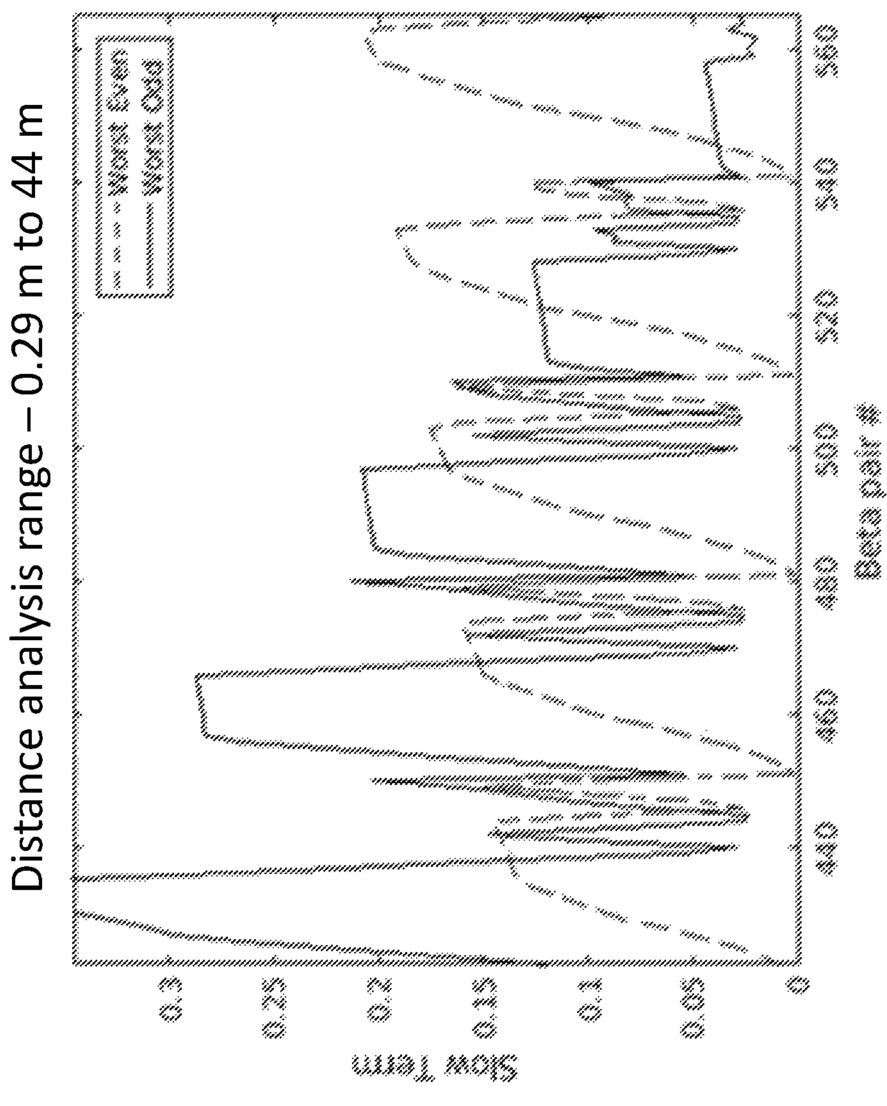
FIG. 9 shows a region of interest of the plot of FIG. 8.

FIG. 8 similarly shows the same variables as FIG. 6 but for a distance range starting at 0.29 m and extending to 44 m. FIG. 9 shows the graph of FIG. 7, but zoomed into the region of interest where the smaller of the minimal band power of the odd and even band is largest. This corresponds to a preferred modulation depth pair of $\beta_1$=1.7 and $\beta_2$=1.7 for a given distance range of 0.29 m to 44 m.

In FIGS. 6 and 8 the modulation depth ($\beta_1$, $\beta_2$) pair enumeration enumerates all points in FIGS. 4 and 5, starting in the bottom left corner ($\beta_1$=0, $\beta_2$=0) which corresponds to pair number 1 going in rows ($\beta_1$ varies fast) up to the top right corner ($\beta_1$=3, $\beta_2$=3). As mentioned above, FIGS. 7 and 9 show a zoom in to the region of interest of FIGS. 6 and 8 respectively. In this form it is easier to see the intersections of the solid line (odd) and dotted line (even) curves and locate the ($\beta_1$, $\beta_2$) pair showing the region with the largest of the weaker summed band power among all odd and even summed band power pairs.

Table 1 (below) is associated with FIGS. 6 and 7 and Table 2 is associated with FIGS. 8 and 9. Tables 1 and 2 respectively show the preferred modulation depth pair ($\beta_1$, $\beta_2$), identified by the Applicant to give the best result for their respective distance ranges. These tables also show the distances at which the weakest odd or even interference intensity band power sum occurs and the value of that power. In these tables, the power values are all relative to the input power of the original unmodulated beam (therefore, units are not required). Also, the modulation depth is a dimensionless parameter requiring no units.

TABLE 1

Information corresponding to beta pair 496 from FIGS. 6 and 7, which is the preferred pair for the distance range 0.5 m to 44 m.

| $\beta_1$ | $\beta_2$ | Lowest Total Power in All Even Bands | Distance Corresponding to Lowest Power in All Even Bands (m) | Lowest Total Power in All Odd Bands | Distance Corresponding to Lowest Power in All Odd Bands (m) |
|---|---|---|---|---|---|
| 1.7 | 1.6 | 0.16023 | 22.215 | 0.20614 | 11.11 |

Note
that the weakest summed, even band power occurs at approximately 22.2 m.
The total power across all bands is assumed to be one unit of power.

As the quadrature signal requires both even and odd band sums to be strong it is necessary to find a region in which both the odd and even plots show greater power values. It can be seen from FIGS. 4 and 5, that this region is approximately given by $1.5 \le \beta_1 \le 1.8$ and $1.5 \le \beta_2 \le 1.8$. FIGS. 7 and 9 show more clearly where exactly the optimal modulation depth values are to be found. As such, the Applicant has determined that this gives a suitable range for the modulation depth pair—with the chosen modulation depths being $\beta_1$=1.7 and $\beta_2$=1.6 for the distance range 0.5 m to 44 m. The results for this choice are shown in table 1 which gives a weakest odd band power sum of 0.20614 at a distance of 11.11 m and a weakest even band power sum of 0.16023 at a distance of 22.215 m.

When evaluating the modulation scheme for a distance range with a shorter minimum distance of 0.29 m, a different modulation scheme arises. The preferred modulation depths and performance figures are listed in table 2 below.

TABLE 2

Information corresponding to beta pair 497 from FIGS. 8 and 9, which is the preferred pair for the distance range 0.29 m to 44 m.

| $\beta_1$ | $\beta_2$ | Lowest Total Power in All Even Bands | Distance Corresponding to Lowest Power in All Even Bands (m) | Lowest Total Power in All Odd Bands | Distance Corresponding to Lowest Power in All Odd Bands (m) |
|---|---|---|---|---|---|
| 1.7 | 1.7 | 0.16088 | 0.29 | 0.20733 | 11.093 |

Note
that the weakest summed, even band power now occurs at the minimum distance of 0.29 m.
For any minimal distances smaller or equal to 0.29 m the weakest even distance will always be the minimal distance and the minimal power in the summed even bands will continuously fall.
The total power across all bands is assumed to be one unit of power.

Thus, embodiments of the invention may allow for simultaneous displacement measurements of a plurality of measurement interferometers—e.g. having different lengths. The number of measurement interferometers that can be used with this invention may only be limited by the amount of laser power that can be provided—e.g. via fibre amplifiers.

The measurement technique described herein may have a low latency of less than or equal to 1 micro second; a high repetition rate of displacement updates greater than or equal to 10 MHz; a high absolute accuracy of approximately a few 10-8 m per metre; and a low RMS displacement noise of less than 100 nm. Embodiments in accordance with the invention may allow for a high channel density (12 channels in a single micro TCA AMC+RTM slot). Displacement data may be output either via an A-Quad-B real-time output or via PCIe bus extension into a PC. There is envisioned to be a strong scalability of channel count—i.e. up to 60 channels with real time output in a single 19 inch rack or 144 channels with PCIe data transfer to a PC in a single 19 inch rack.

The components required to implement the invention, i.e. the optical hardware, are compatible with precursor Frequency Scanning Inteferometry (FSI) technology (e.g. Absolute Multiline™) which measures absolute distances (rather than displacements) and can be made to start from an absolute OPD measurement of matching accuracy. This may help the invention, which measures the change in OPD, to compute an accurate absolute OPD at any given time.

There is a minimum distance below which the lowest summed even band power falls below a set threshold of 0.1—e.g. at approximately 23 cm. Similarly, there is a maximum distance (e.g. approximately 45 m) at which the chosen modulation scheme would break down. For larger distances to become possible either the shortest possible distance is compromised by a choice of modulation frequencies more optimal for the longer distances or the sampling speed of the ADCs must be upgraded thus allowing the faster of the two modulation frequencies to be increased and hence more bands of larger separation to be measurable.

The invention claimed is:

1. An interferometric displacement measurement apparatus, comprising:

at least one measurement interferometer for measuring a change in optical path difference between a measurement beam and a reference beam, the reference beam and the measurement beam having an optical path difference determined by a longitudinal dimension of the measurement interferometer, said change in optical path difference being caused by a respective displacement, wherein the at least one measurement interferometer comprises a photodetector for detecting the interference of the measurement beam with the reference beam;

a data acquisition and analysis module arranged to receive interference intensity data from the photodetector; and a light source module comprising:

a light source arranged to output light having a substantially constant optical carrier frequency; and an electro-optic modulator arranged to modulate the light output from the light source;

wherein the light source module is arranged to generate a modulated light beam, from which the measurement beam and reference beam are derived; and wherein an optical spectrum of the modulated light beam comprises:

a first set of equally spaced frequency peaks having a first frequency spacing, wherein the number, position and power of frequency peaks in the first set are a function of a first modulation frequency and a first modulation depth, and wherein the first set is centred on a central frequency; and a second set of equally spaced frequency peaks having a second frequency spacing, wherein the number, position and power of frequency peaks in the second set are a function of a second modulation frequency and a second modulation depth, and wherein the second set is centred on the same central frequency as the first set;

wherein the first frequency spacing is different to the second frequency spacing and the frequency peaks of the first and second sets are phase locked against each other;

wherein the electro-optic modulator is arranged to be driven by a phase modulation voltage that causes the electro-optic modulator to generate the optical spectrum from the light source, wherein the phase modulation voltage is a time dependent function of the first modulation frequency, the second modulation frequency, the first modulation depth and the second modulation depth, the first modulation frequency determining the first frequency spacing and the second modulation frequency determining the second frequency spacing; and wherein the first frequency spacing ($\Delta v_1$) and second frequency spacing ($\Delta v_2$) ae such that $$k\frac{\Delta v_1}{\Delta v_2} \neq n$$

for $k>10^6$ where k and n are integers;

wherein the data acquisition and analysis module is arranged to determine a measure representative of the displacement using the interference intensity data received from the photodetector.

2. The apparatus of claim 1, wherein the light source is connected to the at least one measurement interferometer via one or more optical fibres(s).

3. The apparatus of claim 1, wherein the measure representative of the displacement is the change in optical path difference between the reference beam and the measurement beam.

4. The apparatus of claim 1, the at least one measurement interferometer comprising a distal end and a proximal end and a reflector defining the distal end;

wherein the measure representative of the displacement is the displacement of said reflector.

5. The apparatus of claim 1, wherein the at least one measurement interferometer comprises a beam splitter comprising a beam splitting surface arranged to split the modulated beam into the measurement beam and the reference beam.

6. The apparatus of claim 1, wherein the at least one measurement interferometer comprises a respective optical fibre, a respective beam splitter, and a respective reflector.

7. The apparatus of claim 1, comprising a plurality of measurement interferometers having respectively different longitudinal dimensions;

wherein the light source module and data acquisition and analysis module are common to the plurality of measurement interferometers.

8. The apparatus of claim 1, wherein the light source is arranged to output light centred on the central frequency which is known in absolute terms with an uncertainty less than the desired displacement measurement uncertainty.

9. The apparatus of claim 1, wherein the difference between any two frequency peak frequencies from the first and second set of frequency peaks is no less than half of the largest expected Doppler shift caused by motion within the measurement interferometer.

10. The apparatus of a claim 1, wherein the interference intensity data comprises a plurality of odd interference intensity frequency bands and a plurality of even interference intensity frequency bands.

11. The apparatus of claim 10, wherein the plurality of odd interference intensity frequency bands and the plurality of even interference intensity frequency bands are centred on frequencies $f_{j,h}=jf_{m_1}+hf_{m_2}$ where j and h are any integer >0, and $f_{m_1}$ is the first modulation frequency and $f_{m_2}$ is the second modulation frequency, and wherein the interference intensity frequency bands are odd if j+h is equal to an odd whole number and are even if j+h is equal to an even whole number.

12. The apparatus of claim 11, wherein all odd combinations of j and h give frequencies $f_{j,h}$ different from all even combinations of j and h.

13. The apparatus of claim 1, wherein the data acquisition and analysis module comprises a low pass filter having a pass band adjusted to suit a required maximum motion speed.

14. The apparatus of claim 1, wherein the first frequency spacing and the second frequency spacing are each substantially constant in time.

15. The apparatus of claim 1, wherein the phase modulation voltage is proportional to $\beta_1 \sin(2\eta f_{m1}t)+\beta_2 \sin(2\pi f_{m2}t)$ wherein $f_{m1}$ is the first frequency spacing, $f_{m2}$ is the second frequency spacing, $\beta_1$ is the first modulation depth, $\beta_2$ is the second modulation depth and t is the elapsed time.

16. The apparatus of claim 1, wherein a maximum value for the larger of the two modulation frequencies is half of a Nyquist frequency of the data acquisition and analysis module; and wherein the larger of the first and second modulation frequencies is selected to be at least 5% lower than said maximum value or is selected to be lower than said maximum value by at least half of the maximum expected Doppler shift caused by motion within the at least one measurement interferometer, wherein the smaller of the first and second modulation frequencies is selected, after the larger of the first and second modulation frequencies is selected, to produce modulation scheme.

17. An interferometric displacement measurement apparatus, comprising:

at least one measurement interferometer for measuring a change in optical path difference between a measurement beam and a reference beam, the reference beam and the measurement beam having an optical path difference determined by a longitudinal dimension of the measurement interferometer, said change in optical path difference being caused by a respective displacement, wherein the at least one measurement interferometer comprises a photodetector for detecting the interference of the measurement beam with the reference beam;

a data acquisition and analysis module arranged to receive interference intensity data from the photodetector; and a light source module comprising:

a light source arranged to output light having a substantially constant optical carrier frequency; and an electro-optic modulator arranged to modulate the light output from the light source;

wherein the light source module is arranged to generate a modulated light beam, from which the measurement beam and reference beam are derived; and wherein an optical spectrum of the modulated light beam comprises:

a first set of equally spaced frequency peaks having a first frequency spacing, wherein the number, position and power of frequency peaks in the first set are a function of a first modulation frequency and a first modulation depth, and wherein the first set is centred on a central frequency; and a second set of equally spaced frequency peaks having a second frequency spacing, wherein the number, position and power of frequency peaks in the second set are a function of a second modulation frequency and a second modulation depth, and wherein the second set is centred on the same central frequency as the first set;

wherein the first frequency spacing is different to the second frequency spacing and the frequency peaks of the first and second sets are phase locked against each other;

wherein the electro-optic modulator is arranged to be driven by a phase modulation voltage that causes the electro-optic modulator to generate the optical spectrum from the light source, wherein the phase modulation voltage is a time dependent function of the first modulation frequency, the second modulation frequency, the first modulation depth and the second modulation depth, the first modulation frequency determining the first frequency spacing and the second modulation frequency determining the second frequency spacing;

wherein the data acquisition and analysis module is arranged to determine a measure representative of the displacement using the interference intensity data received from the photodetector; and wherein the data acquisition and analysis module is arranged to store a modulation scheme, wherein the modulation scheme is used to generate the phase modulation voltage;

wherein the modulation scheme comprises the first modulation frequency, the second modulation frequency, the first modulation depth and the second modulation depth;

wherein the interferometric displacement measurement apparatus is arranged to obtain interference intensity data arising from an interference between the measurement beam and the reference beam, the interference intensity data comprising at least one odd intensity band and at least one even intensity band wherein the odd interference intensity frequency bands and even interference intensity frequency bands occur at frequencies given by $f_{j,h}=jf_{m_1}+hf_{m_2}$, wherein $f_{m_1}$ is the first modulation frequency, $f_{m_2}$ is the second modulation frequency, j and h each comprise an integer >0; and wherein an intensity band is an odd intensity band when the sum of j and h is an odd whole number and wherein an intensity band is an even intensity band when the sum of j and h is an even whole number wherein the apparatus is arranged to:

determine a modulation frequency pair comprising the first modulation frequency and the second modulation frequency;

given said modulation frequency pair, determine a modulation depth pair comprising the first modulation depth and the second modulation depth, by:

for each of a plurality of modulation depth pairs, wherein the modulation depth of the first modulation depth is between 0 and 6 and the modulation depth of the second modulation depth is between 0 and 6:

for each of a plurality of optical path differences:

evaluate the plurality of modulation depth pairs;

determine a first measure representative of the sum of the power of the odd interference intensity frequency bands and a second measure representative of the sum of the power of the even interference intensity frequency bands;

for each of the plurality of modulation depth pairs:

determine the lowest first measure representative of the sum of the power of the odd interference intensity frequency bands and the lowest second measure representative of the sum of the power of the even interference intensity frequency bands from the plurality of optical path differences; and take the lower of the lowest first measure representative of the sum of the power of the odd interference intensity frequency bands and the lowest second measure representative of the sum of the power of the even interference intensity frequency bands, and select one of the plurality of modulation depth pairs, wherein the selected modulation depth pair gives the largest value of said lower measure.

18. An interferometric displacement measurement apparatus, comprising:

at least one measurement interferometer for measuring a change in optical path difference between a measurement beam and a reference beam, the reference beam and the measurement beam having an optical path difference determined by a longitudinal dimension of the measurement interferometer, said change in optical path difference being caused by a respective displacement, wherein the at least one measurement interferometer comprises a photodetector for detecting the interference of the measurement beam with the reference beam;

a data acquisition and analysis module arranged to receive interference intensity data from the photodetector; and light source module comprising:

a light source arranged to output light having a substantially constant optical carrier frequency; and an electro-optic modulator arranged to modulate the light output from the light source;

wherein the light source module is arranged to generate a modulated light beam, from which the measurement beam and reference beam are derived; and wherein an optical spectrum of the modulated light beam comprises:

a first set of equally spaced frequency peaks having a first frequency spacing, wherein the number, position and power of frequency peaks in the first set are a function of a first modulation frequency and a first modulation depth, and wherein the first set is centred on a central frequency; and a second set of equally spaced frequency peaks having a second frequency spacing, wherein the number, position and power of frequency peaks in the second set are a function of a second modulation frequency and a second modulation depth, and wherein the second set is centred on the same central frequency as the first set;

wherein the first frequency spacing is different to the second frequency spacing and the frequency peaks of the first and second sets are phase locked against each other;

wherein the electro-optic modulator is arranged to be driven by a phase modulation voltage that causes the electro-optic modulator to generate the optical spectrum from the light source, wherein the phase modulation voltage is a time dependent function of the first modulation frequency, the second modulation frequency, the first modulation depth and the second modulation depth, the first modulation frequency determining the first frequency spacing and the second modulation frequency determining the second frequency spacing;

wherein the data acquisition and analysis module is arranged to determine a measure representative of the displacement using the interference intensity data received from the photodetector; and wherein the data acquisition and analysis module is further arranged to carry out an analysis algorithm for determining a change in optical path difference from a time-varying interference intensity signal, the analysis algorithm comprising:

receiving a time-varying interference intensity signal, derived from interference detected at a photodetector, comprising a plurality of odd interference intensity frequency bands and a plurality of even interference intensity frequency bands;

extracting each odd interference intensity frequency band using a respective lock-in amplifier;

summing and normalising the plurality of odd interference intensity frequency bands;

extracting each even interference intensity frequency band using a respective lock-in amplifier;

summing and normalising the plurality of even interference intensity frequency bands output from the lock-in amplifiers;

generating an interferometric quadrature signal by combining the normalised sum of the odd interference intensity frequency bands and the normalised sum of the even interference intensity frequency bands; and calculating the change in optical path difference from said interferometric quadrature signal.

19. A method of determining a modulation scheme for use in an interferometric displacement measurement apparatus;

wherein the modulation scheme is used to generate a time-varying phase modulation voltage for modulating a light beam from which a measurement beam and a reference beam are derived;

wherein the modulation scheme comprises a first modulation frequency, a second modulation frequency, a first modulation depth and a second modulation depth;

wherein the interferometric displacement measurement apparatus is arranged to obtain interference intensity data arising from an interference between the measurement beam and the reference beam, the interference intensity data comprising at least one odd band and at least one even band wherein the odd interference intensity frequency bands and even interference intensity frequency bands occur at frequencies given by $f_{j,h}=jf_{m_1}+hf_{m_2}$, wherein $f_{m_1}$ is the first modulation frequency, $f_{m_2}$ is the second modulation frequency, j and h each comprise an integer >0; and wherein a band is an odd band when the sum of j and h is an odd whole number and wherein a band is an even band when the sum of j and h is an even whole number;

the method comprising:

determining a modulation frequency pair comprising the first modulation frequency and the second modulation frequency;

given said modulation frequency pair, determining a modulation depth pair comprising the first modulation depth and the second modulation depth, by:

for each of a plurality of modulation depth pairs, wherein the modulation depth of the first modulation depth is between 0 and 6 and the modulation depth of the second modulation depth is between 0 and 6:

for each of a plurality of optical path differences:

evaluating the plurality of modulation depth pairs;

determining a first measure representative of the sum of the power of the odd interference intensity frequency bands and a second measure representative of the sum of the power of the even interference intensity frequency bands;

for each of the plurality of modulation depth pairs:

determining the lowest first measure representative of the sum of the power of the odd interference intensity frequency bands and the lowest second measure representative of the sum of the power of the even interference intensity frequency bands from the plurality of optical path differences; and taking the lower of the lowest first measure representative of the sum of the power of the odd interference intensity frequency bands and the lowest second measure representative of the sum of the power of the even interference intensity frequency bands, and selecting one of the plurality of modulation depth pairs, wherein the selected modulation depth pair gives the largest value of said lower measure.

* * * * *